(12) United States Patent
Fujii et al.

(10) Patent No.: US 8,227,073 B2
(45) Date of Patent: Jul. 24, 2012

(54) WHITE POLYESTER FILM FOR LIGHT REFLECTIVE PLATE

(75) Inventors: Hideki Fujii, Shiga (JP); Kazunori Tanaka, Shiga (JP); Masahiro Okuda, Shiga (JP)

(73) Assignee: Toray Industries, Inc. (JP)

( * ) Notice: Subject to any disclaimer, the term of this patent is extended or adjusted under 35 U.S.C. 154(b) by 423 days.

(21) Appl. No.: 12/446,605

(22) PCT Filed: Oct. 23, 2007

(86) PCT No.: PCT/JP2007/070582
§ 371 (c)(1),
(2), (4) Date: Apr. 22, 2009

(87) PCT Pub. No.: WO2008/053739
PCT Pub. Date: May 8, 2008

(65) Prior Publication Data
US 2010/0034987 A1    Feb. 11, 2010

(30) Foreign Application Priority Data
Oct. 27, 2006   (JP) ................................. 2006-292294

(51) Int. Cl.
*B32B 7/00* (2006.01)
*B32B 7/02* (2006.01)
*B32B 27/20* (2006.01)
*B32B 27/36* (2006.01)
*G02B 5/02* (2006.01)

(52) U.S. Cl. ........ 428/212; 428/323; 428/327; 428/328; 428/480; 349/61; 349/64; 349/65; 349/112; 349/113; 359/599; 362/97.1

(58) Field of Classification Search ........................ None
See application file for complete search history.

(56) References Cited

U.S. PATENT DOCUMENTS 5,672,409 A * 9/1997 Miyakawa et al. ............ 428/141
6,143,408 A * 11/2000 Fujita ......................... 428/355 R
(Continued)

FOREIGN PATENT DOCUMENTS
EP         0 496 323        *    7/1992
(Continued)

OTHER PUBLICATIONS

Printout of Wikipedia entry—"Least Squares" (printed Jun. 20, 2011).*

(Continued)

*Primary Examiner* — Vivian Chen
(74) *Attorney, Agent, or Firm* — DLA Piper LLP (US)

(57) ABSTRACT

A white polyester film for a liquid crystal display reflective plate realizes a high level of brightness when used in side light type liquid crystal displays and direct type liquid crystal displays. The white polyester film for a light reflective plate has a thickness of 200 μm or more, wherein, in at least one side (side A) of the white polyester film, M is M≦−0.0110 (%/nm) and R560≧100 (%) when the wavelength dependency of spectral reflectance at a wavelength of 450 to 600 nm is approximated according to the following approximation formula R:

$$R = M \times \lambda + B,$$

in which R is an approximation formula by a least square method and represents a light reflectance (%), λ represents a wavelength of light (nm), M represents a wavelength coefficient (%/nm), B represents a constant (%), and R560 represents an estimated reflectance obtained by introducing λ=560 nm into the approximation formula R (%).

17 Claims, 3 Drawing Sheets

U.S. PATENT DOCUMENTS

| | | | |
|---|---|---|---|
| 6,436,219 B1 * | 8/2002 | Francis et al. | 156/244.11 |
| 6,541,114 B2 * | 4/2003 | Katou et al. | 428/403 |
| 6,627,695 B2 * | 9/2003 | Murschall et al. | 524/513 |
| 6,635,340 B2 * | 10/2003 | Peiffer et al. | 428/308.4 |
| 6,641,924 B1 * | 11/2003 | Peiffer et al. | 428/480 |
| 6,771,335 B2 * | 8/2004 | Kimura et al. | 349/112 |
| 6,893,706 B2 * | 5/2005 | Peiffer et al. | 428/141 |
| 6,943,855 B2 * | 9/2005 | Nakano | 349/65 |
| 6,984,322 B2 * | 1/2006 | Suh et al. | 210/502.1 |
| 7,067,188 B1 * | 6/2006 | Yang et al. | 428/327 |
| 7,238,419 B2 * | 7/2007 | Kern et al. | 428/328 |
| 7,674,506 B2 * | 3/2010 | Sogo et al. | 428/1.1 |
| 7,807,240 B2 * | 10/2010 | Francis et al. | 428/32.24 |
| 2002/0001055 A1 | 1/2002 | Kimura et al. | |
| 2003/0128313 A1 * | 7/2003 | Kaminsky et al. | 349/112 |
| 2004/0052079 A1 | 3/2004 | Nakano | |

FOREIGN PATENT DOCUMENTS

| | | | |
|---|---|---|---|
| EP | 0 667 360 | * | 8/1995 |
| EP | 1 760 498 A1 | | 3/2007 |
| JP | 4-239540 A | | 8/1992 |
| JP | 8-16175 B2 | | 2/1996 |
| JP | 11-320795 | | 11/1999 |
| JP | 2001-166295 | * | 6/2001 |
| JP | 2001-166295 A | | 6/2001 |
| JP | 2001-171062 A | | 6/2001 |
| JP | 2001-324608 A | | 11/2001 |
| JP | 2002-090515 | * | 3/2002 |
| JP | 2002-090515 A | | 3/2002 |
| JP | 2002-333510 A | | 11/2002 |
| JP | 2003-160682 A | | 6/2003 |
| JP | 2005-125700 | * | 5/2005 |
| JP | 2005-173546 A | | 6/2005 |
| JP | 2006 018244 A | | 1/2006 |
| JP | 2006 095944 A | | 4/2006 |

OTHER PUBLICATIONS

Printout of Wikipedia entry—"Linear Regression" (printed Jun. 20, 2011).*

* cited by examiner

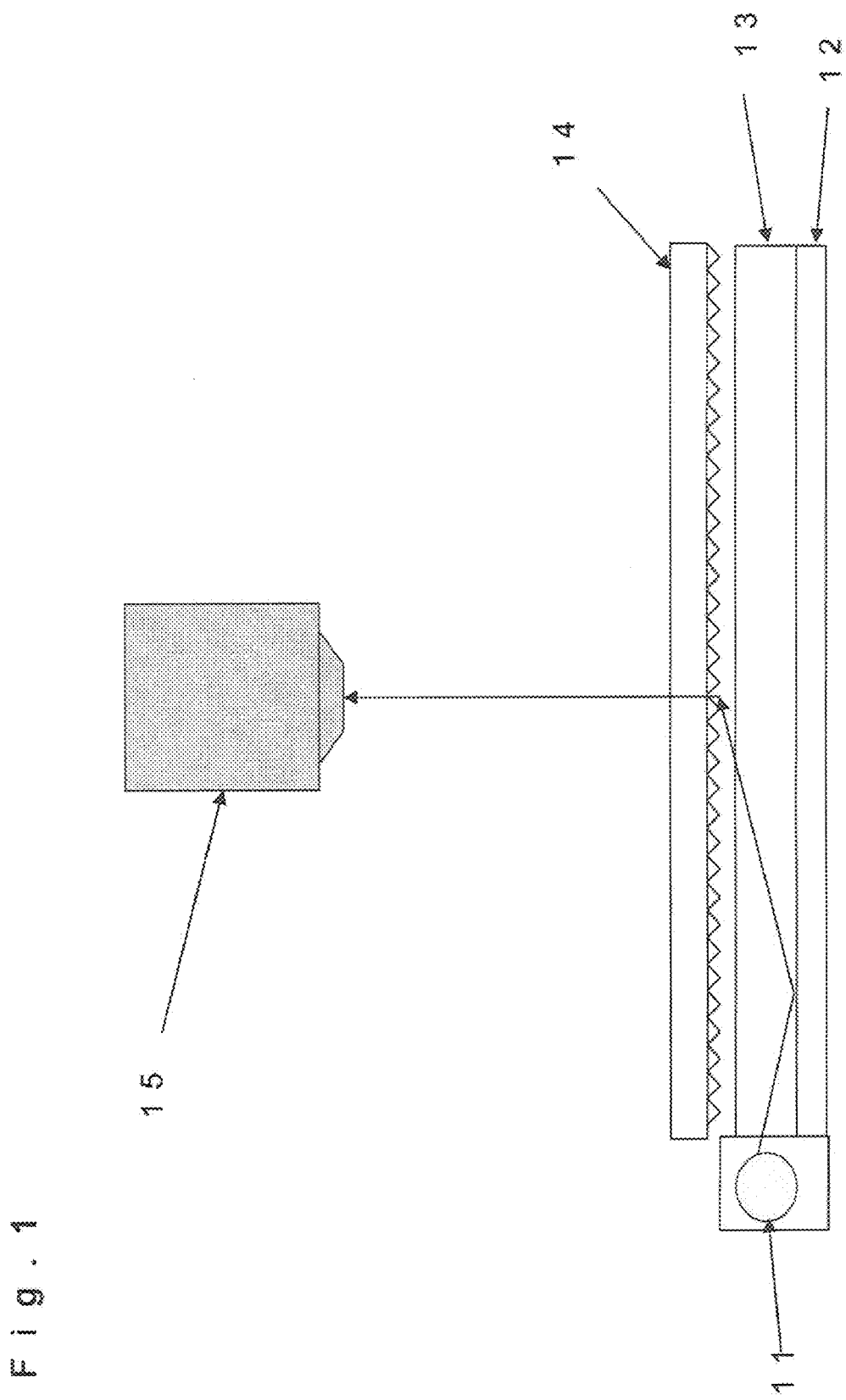

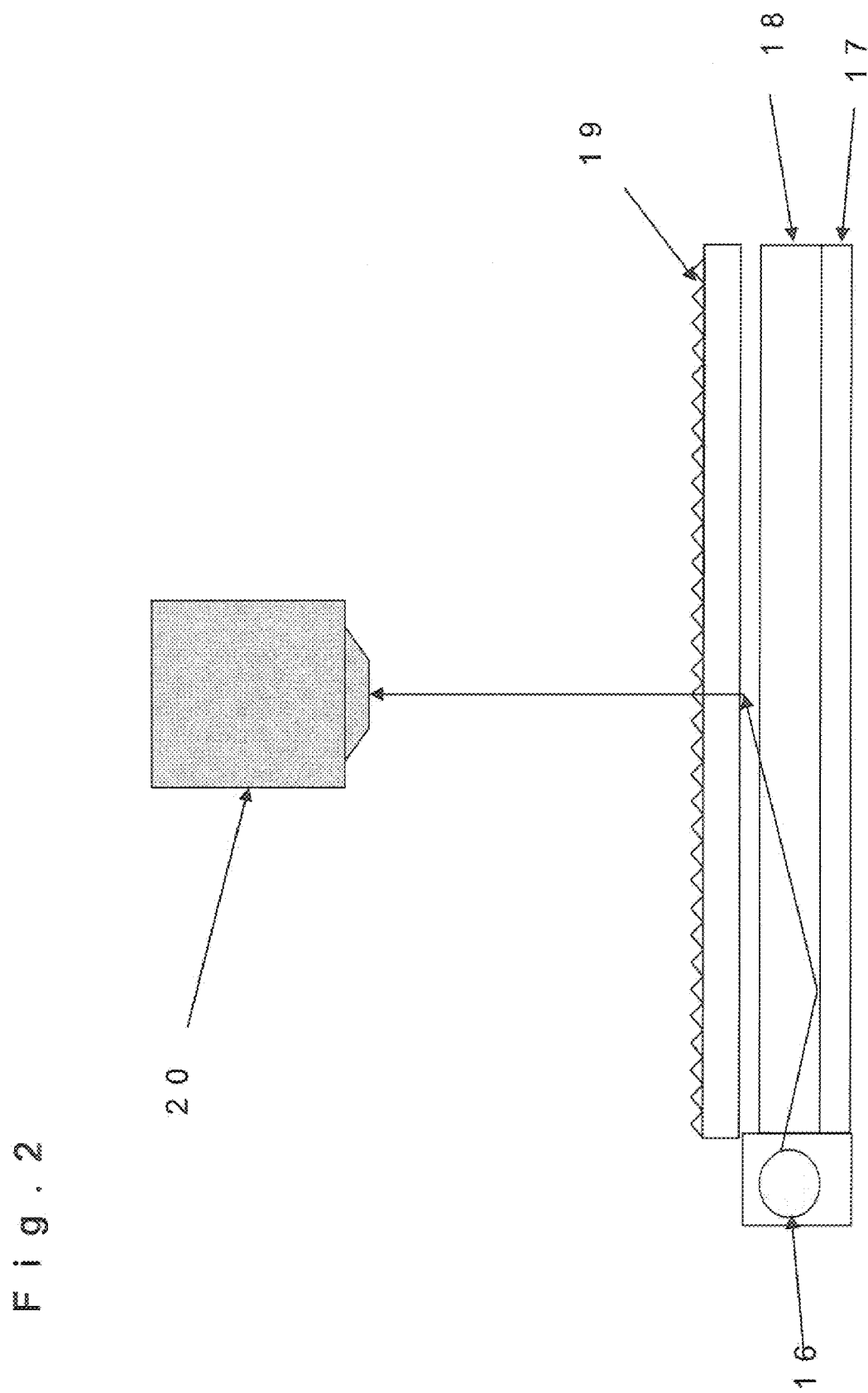

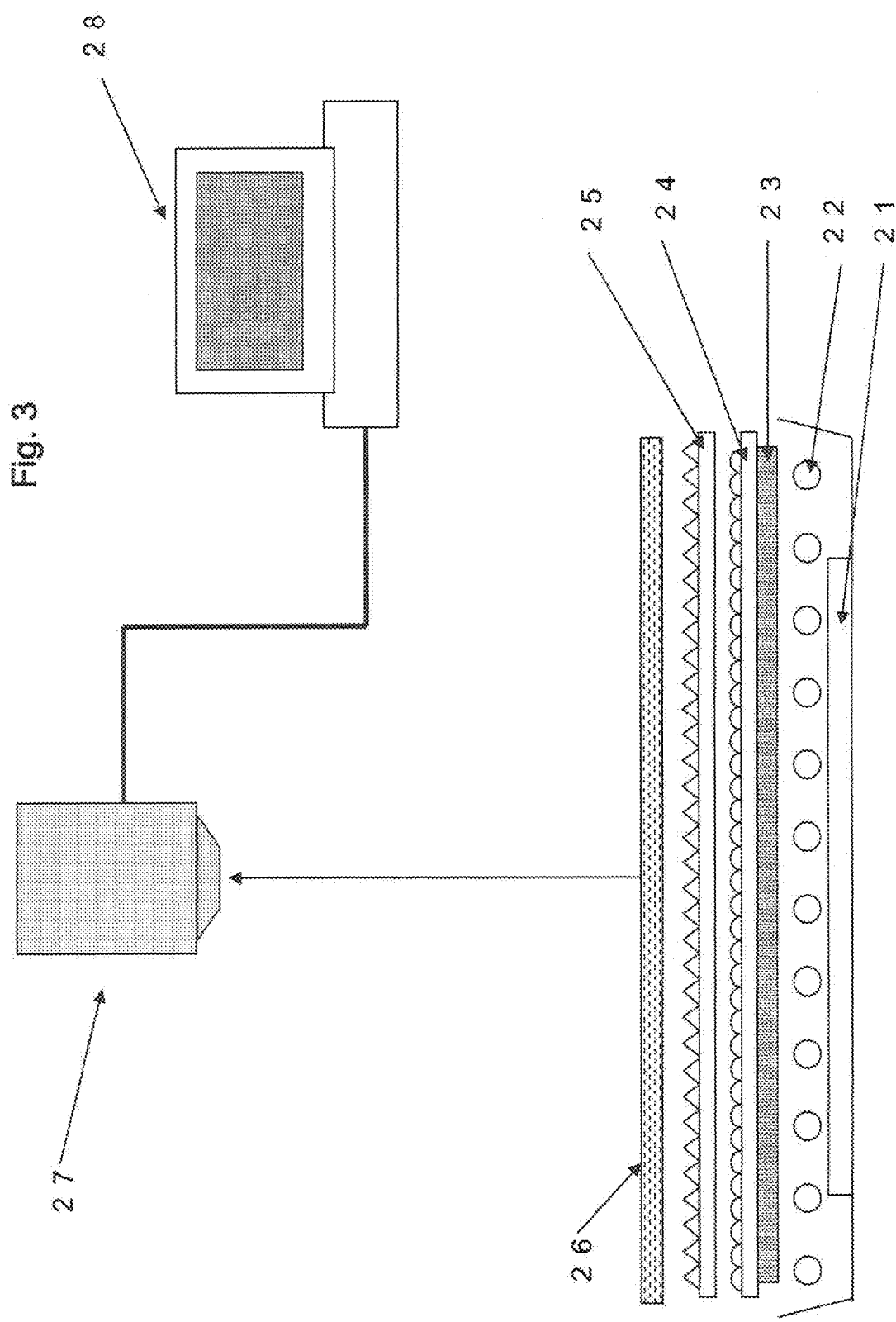

WHITE POLYESTER FILM FOR LIGHT REFLECTIVE PLATE

RELATED APPLICATIONS

This is a §371 of International Application No. PCT/JP2007/070582, with an international filing date of Oct. 23, 2007 (WO 2008/053739 A1, published May 8, 2008), which is based on Japanese Patent Application No. 2006-292294, filed Oct. 27, 2006.

TECHNICAL FIELD

This disclosure relates to a white polyester film for a light reflective plate. Particularly, the disclosure relates to a white polyester film for a liquid crystal display reflective plate used in reflective plates for relatively compact reverse prism type liquid crystal displays such as laptop computers and mobile phones, for side light type liquid crystal displays using conventional BEF systems, and for direct type liquid crystal displays such as flat-screen televisions. Furthermore, the disclosure relates to a super-white polyester film having an excellent reflective property of blue light.

BACKGROUND

As a light source for liquid crystal displays, light sources of a backlight type in which light is irradiated from a backside of a display and a light reflective film described in Japanese Unexamined Patent Publication No. 2003-160682 are heretofore widely used because they have an advantage that they are low-profile and can illuminate uniformly. When they are used, it is necessary to place a light reflective plate on the backside of a screen to prevent the escape of illuminating light to the backside of a screen. Since a small thickness and a high reflective property of light are required for this light reflective plate, white films whitened by containing fine air bubbles within the film and reflecting light at the interface of the air bubble are principally used as a light reflective plate.

Formation of the fine air bubbles is achieved by dispersing a non-compatible polymer having a high-melting point finely in a film base material, for example, polyester, and stretching (e.g., biaxial stretching) the resulting film. Voids (air bubbles) are formed around this non-compatible polymer particles during this stretching, and the void exhibits an effect on light reflection, and therefore the film can be whitened and a high reflectance can be attained (Japanese Examined Patent Publication No. 8-16175). Light reflected off the reflective plate is diffused and light other than light having upward directivity is reflected by a prism, and the reflection is repeated between the reflective plate and the prism, and light is ultimately sent to a liquid crystal cell in a state in which the directivity of light is enhanced. In this case, if reflection efficiency of the reflective plate is low or there are factors which cause light leakage or light decay in a system, since optical loss is produced during repetition of the reflection to deteriorate energy efficiency, the brightness of a screen is lowered or economy is deteriorated.

Further, the light reflective plate is requested to reflect all color (wavelength) of light uniformly from the viewpoint of color reproducibility of a display.

Furthermore, to prevent yellowing of the film due to ultraviolet rays emitted from a cold cathode ray tube, a white film prepared by laminating an ultraviolet absorbing layer is proposed (Japanese Unexamined Patent Publication Nos. 2001-166295 and 2002-90515).

In these white films, various methods for improving properties on the brightness are disclosed. For example, for the purpose of improving the brightness in an edge light type, a method in which a light-shielding layer is provided on the film surface opposite to a light source is disclosed (Japanese Unexamined Patent Publication No. 2002-333510). Further, a method, in which light diffuseness is controlled by selecting a difference in refractive indexes between a spherical particle and a binder and front brightness is improved by a light diffusion sheet, is disclosed (Japanese Unexamined Patent Publication No. 2001-324608). Further, a method, in which brightness unevenness of a backlight is improved by controlling the diffuseness of a film surface on the light source side in a reflective sheet in a direct backlight, is disclosed (Japanese Unexamined Patent Publication No. 2005-173546).

As one method for enhancing the reflection efficiency of the light reflective plate, there is a technique in which number of voids per unit area is increased by increasing a thickness of the white film. We tried this technique, but the brightness of a display was not improved as much as expected and it was found that the wavelength dependency of spectral reflectance varied. That is, light reflectance at a long wavelength was improved, but improvement in a light reflectance at a short wavelength was small.

It could therefore be helpful to provide a white polyester film for a light reflective plate which can attain high brightness when it is used in a side light type liquid crystal display or a direct backlight type liquid crystal display.

SUMMARY

We thus provide white polyester films for liquid crystal display reflective plates as follows:

(1) A white polyester film for a light reflective plate, having a thickness of 200 μm or more, wherein, in at least one side (side A) of the white polyester film, M is M≦−0.0110 (%/nm) and R560≧100 (%) when the wavelength dependency of spectral reflectance at a wavelength of 450 to 600 nm is approximated according to the following approximation formula R:

$R = M \times \lambda + B$, in which R is an approximation formula by a least square method and represents a light reflectance (%), λ represents a wavelength of light (nm), M represents a wavelength co-efficient (%/nm), B represents a constant (%), and R560 represents an estimated reflectance obtained by introducing λ=560 nm into the approximation formula R (%);

(2) The white polyester film for a light reflective plate according to (1), wherein a gloss level of the side A at an incident angle of 60 degrees is 100% or more;

(3) The white polyester film for a light reflective plate according to (1) or (2), wherein a gloss level of the side (side B) opposite to the side A at an incident angle of 60 degrees is 70% or less;

(4) A white polyester film for a light reflective plate, wherein the white polyester film has an applied layer containing spherical particles on at least one side of the white polyester film according to (1) and an absolute value of a difference in refractive indexes between the spherical particle and a binder resin constituting the applied layer is 0.10 or less;

(5) The white polyester film for a light reflective plate according to (4), wherein the spherical particle is a non-porous resin particle and a coefficient of variation CV of a volume average particle size is 30% or less;

(6) The white polyester film for a light reflective plate according to (4) or (5), wherein a resin constituting the spherical particle is at least one selected from the group consisting of acrylic resin, silicone resin, and polystyrene resin, acrylic copolymer, polystyrene copolymer, and copolymer of acrylic vinyl monomer and styrene vinyl monomer;

(7) The white polyester film for a light reflective plate according to (6), wherein the spherical particle contains at least an acrylic resin and the acrylic copolymer is composed of a copolymer of methyl methacrylate and ethylene glycol dimethacrylate;

(8) The white polyester film for a light reflective plate according to (6), wherein the spherical particles are particles having a crosslinking structure;

(9) The white polyester film for a light reflective plate according to (4), wherein the spherical particle contains an ultraviolet absorber and/or a light stabilizer;

(10) The white polyester film for a light reflective plate according to (9), wherein the ultraviolet absorber is at least one of ultraviolet absorbers selected from the group consisting of benzotriazole-based, benzophenone-based, oxalic anilide-based, cyanoacrylate-based and triazine-based ultraviolet absorbers;

(11) The white polyester film for a light reflective plate according to (9), wherein the light stabilizer is a hindered amine-based light stabilizer;

(12) The white polyester film for a light reflective plate according to (4), wherein a resin constituting the spherical particle contains the same monomer components as those of a binder resin constituting the applied layer;

(13) The white polyester film for a light reflective plate according to (1), wherein the white film comprises a three-layer constitution of layer A/layer B/layer A, and the layer B is a layer containing air bubbles, and the layer A is a layer formed by including inorganic particles and/or organic particles in polyester and the content of the particles is 0.5% by weight or less with respect to the total weight of each layer A;

(14) The white polyester film for a light reflective plate according to (1), wherein white film comprises a three-layer constitution of layer A/layer B/layer A', the layer B is a layer containing air bubbles, and the layer A and/or the layer A' is a layer formed by including inorganic particles and/or organic particles in polyester and the thickness of the layer A' is 0.1 to 3 μm;

(19) A lamp reflector for a liquid crystal backlight, wherein the white reflective film according to any one of (1) to (18) is provided with the applied layer face or side B directed to a light source side; and

(20) A direct type liquid crystal backlight, wherein the white reflective film according to according to any one of (1) to (18) is provided with the applied layer face directed to a light source side.

In accordance with the white polyester film for a liquid crystal display reflective plate, unprecedented high brightness can be attained in side light type liquid crystal displays and direct backlight type liquid crystal displays. The white polyester film exhibits high reflective performance particularly in big direct backlight type liquid crystal displays such as a TV set. Further, the white polyester film for a liquid crystal display reflective plate has high reflective performance as relatively compact side light type liquid crystal displays such as laptop computers and mobile phones.

By forming a white reflective film in which on at least one side thereof a specific applied layer is provided, it is possible to absorb ultraviolet rays from a lamp, improve reflectance, and contribute to improvement in brightness of a backlight when applied to the backlight.

BRIEF DESCRIPTION OF THE DRAWINGS

FIG. 1 is a schematic sectional view of a liquid crystal screen (reverse prism type) into which a reflective plate is incorporated.

FIG. 2 is a schematic sectional view of a liquid crystal screen (normal prism type), into which a side light type reflective plate is incorporated, and a reverse prism type, and a schematic view of a measuring method of brightness of the reverse prism type.

FIG. 3 is a schematic sectional view of a liquid crystal screen (direct type), into which a reflective plate is incorporated, and a schematic view of a measuring method of brightness of the direct type.

DESCRIPTION OF THE REFERENCE NUMERALS AND SYMBOLS

11; cold cathode ray tube
12; reflective plate
13; light guide plate
14; prism sheet
15; luminance colorimeter
16; cold cathode ray tube
17; reflective plate
18; light guide plate
19; prism sheet
20; luminance colorimeter
21; reflective plate
22; cold cathode ray tube
23; milky white plate
24; diffusion plate
25; prism sheet
26; polarizing prism sheet
27; CCD camera
28; Image analyzer (EyeScale)

DETAILED DESCRIPTION

Our films have a thickness of 200 μm or more. When the thickness is less than 200 μm, preferable wavelength dependency of spectral reflectance is relatively easily attained but an absolute reflectance is hardly attained. The thickness is preferably 225 μm, and more preferably 300 μm. Further, when the thickness is more than 500 μm, a weigh of a panel may be increased when the film is incorporated into the liquid crystal display.

In at least one side (side A) of the film, M satisfies a relationship of $M \leq -0.0110$ (%/nm) when the wavelength dependency of spectral reflectance at a wavelength of 450 to 600 nm is approximated according to the following approximation formula R:

$$R = M \times \lambda + B,$$

in which R is an approximation formula by a least square method and represents a light reflectance (%), $\lambda$ represents a wavelength of light (nm), M represents a wavelength coefficient (%/nm), and B represents a constant (%).

M satisfies preferably a relationship of $M \leq -0.0140$ (%/nm), and more preferably a relationship of $M \leq -0.020$ (%/nm). The lowest limit of M is not particularly specified, but it is preferable that M falls within a range of $M \geq -0.060$ (%/nm) because the light reflective plate is requested to reflect all color (wavelength) of light uniformly from the viewpoint of color reproducibility of a display. M satisfies furthermore preferably a relationship of M≧−0.050 (%/nm). The film satisfying a relationship of a wavelength coefficient M≦−0.0110 (%/nm) is hitherto found in the films containing pigments, but R560 of these films is less than 100%.

One method for satisfying a relationship of M≦−0.0110 (%/nm) is a method of removing light-scattering components and light-absorbing components in the film as far as possible.

Light is scattered/absorbed by impurities, metal components (catalyst), unsaturated bonds and the like in the reflective film and loses energy in its process. In this time, a part of scattered light is consumed within the reflective film and becomes a component not contributing to the brightness of a screen. Its effect increases as a wavelength becomes short and a short wavelength region of the spectral reflectance becomes relatively low.

Then, the slope M can fall within the region by adjusting the degree of purity of polymer, metal components (catalyst), and color tone of polymer. Herein, the degree of purity of polymer refers to a quantity of unsaturated bond in a polymer and a polymer having less unsaturated bond is preferably used in the film. Further, the metal components (catalyst) comprise the following element group. Examples of the metal components (catalyst) include compounds using an element group of Sb, K, P, Mg, Li, Ca, Ge and Ti, but preferably, the amounts of the components are so small that polymerization of polymer may not be affected.

As for color tone of the polymer, in color tone of material chips, a polymer having a high L value (brightness) and a low b value (degree of yellow) is preferably used. By reducing these light-scattering/absorbing components, a reflectance in a short wavelength region becomes relatively high and a slope M becomes small. The reflectance in a short wavelength region is improved as the slope M becomes small, and this contributes to the improvement in the brightness of a screen.

It is necessary that an estimated reflectance R560 obtained by substitution of λ=560 into the approximation formula be 100% or more in at least one side of the film. When the estimated reflectance is less than 100%, the brightness as backlights of a side light type liquid crystal display or a direct type liquid crystal display is deteriorated.

It is important that the film be whitened by containing fine voids within the film to make the R560 100% or more, as described below, and when the number of voids is increased, the reflectance R560 can be improved. The reflectance R560 is preferably 102% or more, and more preferably 104% or more. There is not an upper limit on the reflectance R560, but the reflectance R560 is preferably 110% or less because it is necessary to increase an addition amount of the void nucleus for increasing the reflectance R560 and in that case, a film forming property may become unstable.

In one aspect, a gloss level (60 degrees) of at least one side (side A) is preferably 100% or more. The gloss level is more preferably 115% or more, and furthermore preferably 120% or more. When the gloss level is less than 100%, light is scattered, and therefore a part of the scattered light proceeds to an angle region where light is all reflected within a film, and it cannot escape from the film to decay until the light is scattered again.

To make the gloss level 100% or more, it is important that the number of inorganic or organic particles contained in the film be decreased. If the inorganic or organic particles having particle sizes similar to wavelengths of visible light are present in the vicinity of the film surface, the gloss level is reduced below 100%. Further, in many cases, since these particles have refractive indexes which are different from that of the film, light is also scattered within the film. This effect is significant in light of short wavelength and it is not preferable that a large amount of particles be present within the film.

Further, in another aspect of the film, it is preferable to form a surface in which a gloss level at an incident angle of 60 degrees is 70% or less. Particularly, in the side light type backlight, since the incident angle of light is shallow, light needs to be diffused forward. It is possible to preferably apply a surface in which a gloss level at an incident angle of 60 degrees is 70% or less by a method of controlling surface roughness. Examples of the method of controlling surface roughness include a method of adding particles having a refractive index close to that of a film matrix resin, and a method of thinning a layer A' to a thickness of 0.1 to 3 μm. When the layer A' is thinned, if a layer B is a layer including voids, the interface of the layer B becomes a rough surface due to the presence of the void and this rough interface resulting from the voids of the layer B can affect the layer A' to change the surface roughness. The thickness of the layer A' is preferably 0.5 to 2 μm, and more preferably 0.8 to 1.5 μm.

Polyester is a polymer prepared from diol and dicarboxylic acid by polycondensation. Representative examples of the dicarboxylic acids include terephthalic acid, isophthalic acid, phthalic acid, naphthalenedicarboxylic acid, adipic acid, and sebacic acid, and representative examples of diol include ethylene glycol, trimethylene glycol, tetramethylene glycol, and cyclohexane dimethanol. Specific examples of the Polyesters include polymethylene terephthalate, polytetramethylene terephthalate, polyethylene-p-oxybenzoate, poly(1,4-cyclohexylenedimethylene terephthalate), and polyethylene-2,6-naphthalenedicarboxylate. Particularly, polyethylene terephthalate and polyethylene naphthalate are preferable.

Naturally, these polyesters may be a homopolyester or a copolyester, and examples of the copolymer components include diol components such as diethylene glycol, neopentyl glycol and polyalkylene glycol; and dicarboxylic acid components such as adipic acid, sebacic acid, phthalic acid, isophthalic acid, 2,6-naphthalenedicarboxylic acid and 5-sodium sulfoisophthalic acid.

Further, known various additives such as antioxidants and antistatic agents may be added to this polyester. As the polyester, polyethylene terephthalate is preferable. A polyethylene terephthalate film is superior in water resistance, durability and chemical resistance.

The film is preferably whitened by containing fine air bubbles within the film. Formation of the fine air bubbles is preferably achieved by dispersing a high-melting point polymer which is non-compatible with polyester finely in a film base material, for example polyester, and stretching (e.g., biaxial stretching) the resulting film. Voids (air bubbles) are formed around this non-compatible polymer particles upon this stretching, and the void generates a difference in refractive indexes between the resin and the air layer to reflect light, and therefore the film can be whitened and a high reflectance can be attained. The polymer non-compatible with polyester (hereinafter, sometimes abbreviated as "non-compatible polymer") is, for example, a polymer having a melting point of 180° C. or higher, selected from poly-3-methylbutene-1, poly-4-methylpentene-1, polyvinyl-t-butane, 1,4-trans-poly-2,3-dimethylbutadiene, polyvinylcyclohexane, polystyrene, polymethylstyrene, polydimethylstyrene, polyfluorostyrene, poly-2-methyl-4-fluorostyrene, polyvinyl t-butyl ether, cellulose triacetate, cellulose tripropionate, polyvinyl fluoride, amorphous polyolefin, cyclic olefins copolymer resin, and polychlorotrifluoroethylene. Among them, polyolefins, particularly polymethylpentene and cyclic olefin, are preferable for the polyester base material. Cyclic olefins copolymer resin is a copolymer of ethylene and at least one cyclic olefin selected from the group consisting of bicycloalkenes and tricycloalkenes.

An addition amount of the non-compatible polymer (e.g., polyolefin) is preferably 5% by weight or more and 40% by weight or less, taking an amount of the whole layer containing the non-compatible polymer as 100% by weight. The addition amount is more preferably 10% by weight or more and 30% by weight or less, and furthermore preferably 15% by weight or more and 25% by weight or less. When the addition amount is less than 5% by weight, an effect of whitening becomes low and a high reflectance is hardly attained, and when the addition amount is more than 25% by weight, mechanical properties such as strength of a film itself may become too small and there causes a problem that the film is apt to break in stretching and therefore productivity is deteriorated. With respect to a relationship between the addition amount of the non-compatible polymer and optical properties, the number of void nucleuses increases and the number of void layers increases as the addition amount of the non-compatible polymer increases, and therefore a reflectance is improved to contribute to improvement of brightness.

It is effective to add a specific gravity-decreasing material as a dispersion aid to disperse the non-compatible polymer as a particle having a particle size of 0.2 to 5 μm. The specific gravity-decreasing material is a compound having an effect of decreasing a specific gravity and specific compounds have such an effect. As the specific gravity-decreasing material, thermoplastic polyester elastomer is used. For example, representative examples thereof include polyalkylene glycols such as polyethylene glycol, methoxy polyethylene glycol, polytetramethylene glycol and polypropylene glycol, ethylene oxide/propylene oxide copolymer, sodium dodecylbenzene sulfonate, sodium alkylsulfonate, glyceryl monostearate, tetrabutylphosphonium, and p-aminobenzenesulfonate. Particularly, polyalkylene glycols, among them, polyethylene glycol is preferable. Further, a copolymer of polybutylene terephthalate and polytetramethylene glycol is preferably used to improve the dispersibility of a non-compatible polymer. An addition amount of the specific gravity-decreasing material is preferably 3% by weight or more and 40% by weight or less, taking an amount of the whole layer containing the non-compatible polymer as 100% by weight. When the addition amount is less than 3% by weight, an effect of addition becomes low and the dispersibility of a polymer is deteriorated, and when the addition amount is more than 40% by weight, intrinsic characteristics of a base material of the film may be impaired. Such the specific gravity-decreasing material can be controlled by being added to a film base material polymer in advance to prepare a master polymer (master chip). With respect to a relationship between the specific gravity-decreasing material and optical properties, in a region from 3% by weight to 40% by weight, since a dispersion diameter becomes extremely small by adding a dispersion aid, number of void layers per the same thickness increases and the reflectance is improved, and this contributes to increase in brightness of a screen. In a region of more than 40% by weight, even if the addition amount is increased, a dispersion diameter may not become small and may have no effect.

As described above, when the white polyester film contains fine air bubbles, thereby, the apparent specific gravity of the polyester film becomes lower than that of a common polyester film. If further adding the specific gravity-decreasing material, the specific gravity is further decreased. That is, a white and light film can be obtained. To reduce the weight of the white polyester film for a liquid crystal display of the present invention while maintaining mechanical properties as a substrate for a liquid crystal display reflective plate, it is preferable that the apparent specific gravity be 0.5 or more and 1.2 or less. The apparent specific gravity is preferably 0.5 or more and 1.0 or less, and more preferably 0.55 or more and 0.8 or less.

To make the apparent specific gravity 0.5 or more and 1.2 or less, in the case of using the specific gravity-decreasing material, for example polymethylpentene having a specific gravity of 0.83, as described above, the specific gravity-decreasing material is contained in an amount 5% by weight or more and 25% by weight or less with respect to the total weight of all layers and the film is stretched by 2.5 times to 4.5 times. When the apparent specific gravity falls within the range, it is possible to allow a large number of fine air bubbles to exist while maintaining film strength and a high reflectance can be attained. That is, when the white film is used as a liquid crystal display reflective plate, it exhibits significantly excellent brightness in the brightness of a screen.

Further, the constitution of the white polyester film for a liquid crystal display reflective plate may be a two-layer constitution of layer A/layer B, or may be a three-layer constitution of layer A/layer B/layer A, layer A/layer B/layer A' or layer A/layer B/layer C, or may be a multi-layer constitution of layer A/layer B/ . . . /layer B/layer A, for example, constitutions composed of at least 20 layers and at most 3000 layers. It is preferable for achieving a high reflectance and a film forming property simultaneously that the layer B become a layer containing the foregoing fine air bubbles. In the case of forming layer A/layer B/layer A', the same material is used in the layer A and the layer A', but a thickness of the layer A' is made smaller than that of the layer A. A preferable thickness of the layer A' is 0.1 to 3 μm, and more preferably 0.5 to 2 μm. Further, it is preferable from the viewpoint of reducing light loss due to scattering and improving a mirror reflective property that the layer A (layer A') and/or the layer C corresponding to the surface of the film be layers formed by including inorganic particles and/or organic particles in polyester in an amount at least 0.01% by weight and at most 0.5% by weight, preferably at most 0.1% by weight, more preferably at most 0.07% by weight with respect to the total weight of the layer A and/or the layer C (layers containing inorganic particles and/or organic particles). When the particles are added, as described above, a mirror reflective property is improved and therefore the gloss level can be increased to 110% or more. However, when the addition amount of inorganic particles and/or organic particles is less than 0.01% by weight, since the surface becomes extremely smooth, the slidability of a flat surface is deteriorated and wind defects are apt to occur to decrease yield. The addition amount of inorganic particles and/or organic particles is preferably 0.01% by weight or more from the viewpoint of handling ability (prevention of surface flaws).

Light diffuseness may be required depending on the form of other members of a backlight in which the reflective film is used. In this case, it is also possible to bring the gloss level into 70% or less by including more particles in the layer A'.

As inorganic particles and/or organic particles contained in a surface layer of the film, particles of a material selected from the group consisting of calcium carbonate, silica, magnesium carbonate, zinc carbonate, titanium oxide, zinc oxide, cerium oxide, magnesium oxide, barium sulfate, zinc sulfide, calcium phosphate, alumina, mica, titanated mica, talc, clay, kaolin, lithium fluoride and calcium fluoride can be used. Silica is desirably used to maintain a high gloss of the surface.

Herein, when a type of a backlight is a direct type, an addition amount of the particles is preferably ultimately 0% by weight, but since in this case slidability of the film is deteriorated and productivity is deteriorated, it is preferable to add a small amount of the particles. The addition amount of the particles preferably falls within the region in consideration of an effect on an M value resulting from light scattering due to particle addition.

Further, the reverse prism type has a structure in which the reflective plate 12 adheres tightly to the light guide plate 13 due to the constitution of this type in FIG. 1 and therefore there readily causes a problem that inorganic particles are exfoliated to damage the light guide plate. When the addition amount of the particles exceeds 0.5% by weight, the exfoliation of particles is apt to cause the flaws. The addition amount of the particles is preferably 0.5% by weight or less, and more preferably 0.1% by weight or less.

In the edge light type, if the planarity of the reflective film is too high, locations where the film strongly adheres to the light guide plate are generated to change a reflection angle there, and thereby, brightness unevenness in a liquid crystal screen may be produced. It is commonly carried out that the adhesion of the reflective film to the screen is decreased by giving a certain degree of surface roughness to the surface. A number average particle size of the particles added for this purpose is preferably 3 μm or more and 7 μm or less, and more preferably 3 to 5 μm. When the number average particle size on number is less than 3 μm, the roughness of the surface is lowered and adhesion between the film and the light guide plate may become high. When the average particle size is more than 7 μm, since the particle becomes coarse, it tends to exfoliate and this may damage the light guide plate. On the other hand, in the direct type, since a cold cathode ray tube exists between the light guide plate and the reflective film, the light guide plate does not come into contact with the reflective film and there is not a possibility of occurrence of flaws of the light guide plate and the screen non-uniformity due to adhesion.

The white polyester film preferably has an applied layer containing spherical particles on at least one side of the white polyester film. By containing the spherical particles, a projection shape is formed at the surface of the applied layer, and the light, which is reflected off the white film surface and passes through the applied layer, is concentrated by a lens effect through the projection shape at the surface of the applied layer and this contributes to improvement in the brightness in a front direction of a backlight.

A type of the spherical particle is not particularly limited, and any of organic particles and inorganic particles can be employed. As the organic spherical particles, acrylic resin particles, silicone resin particles, nylon resin particles, polystyrene resin particles, polyamide resin particles such as benzoguanamine, and urethane resin particles can be used. As the inorganic spherical particles, silicon oxide, aluminum hydroxide, aluminum oxide, zinc oxide, barium sulfide, magnesium silicate, and mixtures thereof can be used. It is preferable to use the organic spherical particles from the viewpoint of dispersibility of the particles in a resin binder commonly used, ability to be applied and economy. Among them, acrylic polymers, polystyrene polymers, and copolymers of acrylic-based vinyl monomer and styrene-based vinyl monomer are preferable, and particularly, and copolymers of acrylic-based vinyl monomer and styrene-based vinyl monomer can be suitably used because a refractive index can be changed by adjusting a copolymerization proportion of two kinds of vinyl monomers.

When the applied layer is provided, it is preferable to adjust an absolute value (hereinafter, referred to as a refractive index differential) of a difference in refractive indexes between the spherical particle contained in the applied layer and the binder resin constituting the applied layer to 0.10 or less. As described above, when the applied layer contains the spherical particles, the brightness in a front direction of a backlight is improved. However, if there is the refractive index differential between the spherical particle and the binder resin, light, which is diffused at the interface between the spherical particle and the binder resin and reaches the surface of the applied layer, of the light, which is reflected off the white film surface and passes through the applied layer, is reduced. That is, light loss due to internal diffusion is increased and the reflectance is reversely reduced. Since by adjusting the refractive index differential to 0.10 or less, internally diffusing loss in the applied layer is reduced, light to reach the surface of the applied layer is relatively increased and the reflectance is improved. When the refractive index differential is more than 0.10, even if the white reflective film is incorporated into the backlight, an effect of improving the brightness may not be achieved. The refractive index differential is preferably 0.08 or less, more preferably 0.05 or less, and particularly preferably 0.01 or less.

The refractive index herein refers to a proportion in which the undulation (such as light) traveling in a straight line changes an angle of a traveling direction at an interface between mediums, and it is a vacuum-based substance-specific value, that is, an absolute refractive index. Since the refractive index is an observed wavelength-specific value, the refractive index differential is a difference between values measured at the same observed wavelength. For example, a refractive index of poly(methyl methacrylate), a typical acrylic resin, is 1.49 for light having a wavelength of 589.3 nm.

The refractive index differential referred to herein refers to an absolute value of a difference between a refractive index of the spherical particle and a refractive index of the binder resin, and even when the refractive index of the spherical particle is smaller than that of the binder resin and the refractive index differential is a negative value, its absolute value, that is, a positive value is a refractive index differential.

"The refractive index of the spherical particle", and "the refractive index of the binder" are determined as follows:

(i) A binder resin is extracted from an applied layer by using an organic solvent and the organic solvent is distilled off, and then a refractive index of light is measured at 25° C. at a wavelength of 589.3 nm with an ellipsometry method. Values obtained by this measurement are taken as "a refractive index of a binder resin."

(ii) The applied layer of a white reflective film is immersed in an organic solvent, and the applied layer is peeled off from the white film and then the applied layer is pressed against a slide glass and slid on the slide glass to exfoliate spherical particles from the applied layer. A refractive index of the obtained spherical particle is determined according to a Becke's line detection method. Specifically, the particle is put in a liquid organic compound, and the particle in the liquid organic compound is observed at various liquid temperatures at which a refractive index of the liquid is known and the refractive index of the liquid organic compound at the time when the outline of the particle cannot be recognized is taken as "a refractive index of a spherical particle."

The volume average particle size is not particularly limited as long as the projection shape is formed at the surface of the applied layer, but the volume average particle size is preferably 0.05 μm or more, more preferably 0.5 μm or more, furthermore preferably 1 μm or more, and particularly preferably 3 λm or more. When the volume average particle size is less than 0.05 μm, an effect of improving the brightness of a backlight may not be achieved. Further, an upper limit of the volume average particle size is not particularly limited, but it is preferably 100 μm or less since the ability to be applied may be poor if it exceeds 100 μm.

In the spherical particles, a coefficient of variation CV of the volume average particle size is preferably 30% or less. The coefficient of variation CV herein refers to a value obtained by dividing a standard deviation of the volume average particle size by the volume average particle size. This coefficient of variation CV is measured by a method described in Example described later. The coefficient of variation CV is more preferably 20% or less, particularly preferably 15% or less, and the most preferably 10% or less. When the coefficient of variation CV is more than 30%, since the uniformity of the particles is poor, the diffuseness of light is intensified and an effect of improving the brightness of a backlight may become low. The CV value can be reduced by classifying the particles and removing the particles having an uneven particle size.

The spherical particle is preferably nonporous from the viewpoint of improvement in reflectance and light resistance. If the spherical particle is porous, an area of refractive interface between the binder resin and the spherical particle increases, and therefore light loss due to internal diffusion is increased and the reflectance is apt to decrease. Further, when a light resistant resin is used as a binder resin of the applied layer, if the spherical particle is porous, the binder resin is penetrated into pores. Therefore, even if the binder resin is added in the same amount as that of the binder resin in a case where nonporous spherical particles are used, a thickness of the applied layer becomes relatively small and the light resistance may be deteriorated.

The content of the spherical particles in the applied layer is not particularly limited as long as the reflectance is improved, but the content of the spherical particle is preferably 3% by weight or more with respect to the whole applied layer, though it cannot be uniquely limited because it depends on the types of the particle and the dispersibility of the particle in a coating solution. The content is more preferably 5% by weight or more, furthermore preferably 10% by weight or more, and particularly preferably 15% by weight or more. When the content is less than 3% by weight, an effect of improving the brightness of a backlight may not be achieved. Further, an upper limit of the content is not particularly limited, but the content is preferably 30% by weight or less since the ability to be applied may be poor if it exceeds 30% by weight.

When the applied layer is provided, since the spherical particle needs to be dispersed in a solvent during an applying step, the spherical particle requires solvent resistance and therefore the spherical particles preferably have a crosslinking structure. When the spherical particles do not have a crosslinking structure, the spherical particles are eluted during the applying step and there may be cases where the applied layer in which particle shapes and particle sizes are maintained cannot be provided.

To form the crosslinking structure, it is preferable to form the crosslinking structure by use of vinyl compounds having a plurality of functional groups in a molecule, and it is particularly preferable to use polyfunctional acrylic compounds such as difunctional acrylic compounds, trifunctional acrylic compounds, and at least tetrafunctional acrylic compounds as vinyl compounds having a plurality of functional groups in a molecule.

As the spherical particle, "TECHPOLYMER" (manufactured by SEKISUI PLASTICS Co., Ltd.) can be used. When a coefficient of variation is 30% or less, S series in the "TECHPOLYMER" products are preferable, and when a coefficient of variation is 15% or less, spherical particles made of a copolymer of methyl methacrylate and ethylene glycol dimethacrylate such as SSX series products can be most suitably used.

In the spherical particles, it is preferable that an ultraviolet absorber and/or a light stabilizer be added and that in producing these resins, the resin be chemically combined with an ultraviolet absorber and/or a light stabilizer, having a reactive double bond, by copolymerization. It is preferable to fix the ultraviolet absorber and/or the light stabilizer by chemically combining like the latter in that bleed out from the spherical particle is less.

The ultraviolet absorber and the light stabilizer contained in the spherical particle are broadly divided into inorganic agents and organic agents.

As inorganic-based ultraviolet absorbers, titanium oxide, zinc oxide, cerium oxide and the like are commonly known, and among them, zinc oxide is the most preferable in point of economy, an ultraviolet absorbing property and photocatalyst activity.

Examples of organic-based ultraviolet absorbers may include benzotriazole-based, benzophenone-based, oxalic anilide-based, cyanoacrylate-based and triazine-based ultraviolet absorbers. Since these ultraviolet absorbers just absorb ultraviolet rays and cannot capture organic radicals produced by ultraviolet irradiation, this radical may cause chain reaction degradation of a white film to become a substrate. It is preferable to use the ultraviolet absorber in combination with the light stabilizer to capture these radicals and particularly a light stabilizer of a hindered amine-based compound is suitably used.

As copolymerization monomers to fix the organic-based ultraviolet absorbers and/or the light stabilizers, acrylic-based or styrene-based vinyl monomers are preferable because of high general versatility and economy. Since styrene-based vinyl monomers have aromatic rings and are susceptible to yellowing, they are the most preferably copolymerized with the acrylic-based vinyl monomer from the viewpoint of light resistance.

As a reactive vinyl monomer-substituted benzotriazole, 2-(2'-hydroxy-5'-methacryloxyethylphenyl)-2H-benzotriazole (trade name: RUVA-93, manufactured by Otsuka Chemical Co., Ltd.) can be used. Further, as a reactive vinyl monomer-substituted hindered amine compound, 4-methacryloyloxy-2,2,6,6-tetramethylpiperidyne ("ADK STAB LA-82" manufactured by Adeka Argus Industry Co., Ltd.) can be used.

Since if a difference in refractive indexes between the binder resin and the spherical particle in the applied layer is reduced as far as possible, the reflectance is improved, it is preferable that copolymer components and monomer composition of the binder resin be identical to those of the spherical particle. Furthermore, when both of the binder resin and the spherical particle are composed of resins to which an ultraviolet absorber and/or a light stabilizer is added, the light resistance of the applied layer can also be improved.

The white film of a substrate may be deteriorated (e.g., photodeterioration such as yellowing, or degradation in which a molecular weight is decreased) during being used as a backlight by light, particularly ultraviolet rays, emitted from a lamp of a cold cathode ray tube or the like, and therefore it is preferable that the ultraviolet absorber and/or the light stabilizer be contained in a layer of the white film of a substrate and/or in the binder resin layer provided on one side.

Materials of the binder resin layer is not particularly limited, but resins principally containing organic components are preferable and examples of the resins include polyester resin, polyurethane resin, acrylic resin, methacrylic resin, polyamide resin, polyethylene resin, polypropylene resin, polyvinyl chloride resin, polyvinylidene chloride resin, polystyrene resin, polyvinyl acetate resin, and fluorine-based resins. These resins may be used alone or as a copolymer or a mixture of two or more kinds of them. Among them, the polyester resin, the polyurethane resin, and acrylic or methacrylic resin are preferably used from the viewpoint of heat resistance, dispersibility of particles, an ability to be applied and a gloss level. From the viewpoint of the light resistance of the applied layer, it is more preferable that the binder resin layer also contain an ultraviolet absorber and a light stabilizer.

A resin constituting a resin layer containing an ultraviolet absorber is not particularly limited, and resins containing an inorganic ultraviolet absorber, resins containing an organic ultraviolet absorber, and resins formed by copolymerizing a benzotriazole-based or a benzophenone-based reactive monomer can be used.

As a resin constituting a resin layer containing a light stabilizer, organic ultraviolet absorbing resins containing a resin formed by copolymerizing a hindered amine (HALS)-based reactive monomer and the like are preferably used.

As the inorganic-based ultraviolet absorber, zinc oxide, titanium oxide, cerium oxide and zirconium oxide are common. Among these absorbers, at least one selected from the group consisting of zinc oxide, titanium oxide and cerium oxide is preferably used because it does not cause bleed out and has an excellent light resistance. Such ultraviolet absorber may be used in combination of several kinds as required. Among them, zinc oxide is the most preferable in point of economy, an ultraviolet absorbing property and photocatalyst activity. As the zinc oxide, FINEX-25 LP, FINEX-50 LP (manufactured by Sakai Chemical Industry Co., Ltd.) and the like can be used.

As the organic-based ultraviolet absorbers, resins containing an organic ultraviolet absorber such as benzotriazole and benzophenone, resins formed by copolymerizing a benzotriazole-based or a benzophenone-based reactive monomer, or resins formed by copolymerizing these resins with a light stabilizer such as a hindered amine (HALS)-based reactive monomer can be used. Particularly, resins formed by copolymerizing a benzotriazole-based or a benzophenone-based reactive monomer, and organic ultraviolet absorbing resins containing a resin formed by copolymerizing a hindered amine (HALS)-based reactive monomer with the resins are more preferable because of a large effect of absorbing ultraviolet light in a thin layer.

Methods for manufacturing these resins are disclosed in detail in paragraphs [0019] to [0039] of Japanese Unexamined Patent Publication No. 2002-90515. Particularly, HALSHYBRID (registered trademark) (manufactured by NIPPON SHOKUBAI CO., LTD.) containing a copolymer of an acrylic monomer and an ultraviolet absorber as an active component, and the like can be used.

As described previously, if a difference in refractive indexes between the resin binder and the spherical particle is reduced as far as possible, since the reflectance is improved and further the light resistance of the applied layer is also improved, it is preferable that copolymer components, monomer composition, ultraviolet absorbers and light stabilizers of the resin binder be identical to those of the spherical particle.

Next, a method for manufacturing a white polyester film for a light reflective plate will be described, but our films and methods are not limited to this example.

First, purity of terephthalic acid being a base of polyethylene terephthalate is increased to reduce a total amount of metal catalyst compounds such as compounds using an element group of Sb, K, P, Mg, Li, Ca, Ge and Ti at the time of forming polyester being a base by polymerization, and by controlling reaction time and reaction temperature, polyethylene terephthalate, which has less catalyst residue and has a high L value and a low b value, is obtained.

Next, polymethylpentene as a non-compatible polymer, and polyethylene glycol and a copolymer of polybutylene terephthalate and polytetramethylene glycol as a specific gravity-decreasing material are mixed in the polyethylene terephthalate formed by polymerization by the above method, and the resulting mixture is adequately mixed and dried, and then supplied to an extruder A heated to a temperature of 270 to 300° C. If required, polyethylene terephthalate including inorganic additives such as $SiO_2$ may be supplied to an extruder B by a common method, and a layer of the extruder A and a layer of the extruder B may be laminated in a three-layer constitution of layer A/layer B/layer A in a T-die three-layer nozzle so that a polymer of the layer of the extruder B becomes both surface layers.

This melted sheet was brought into close contact with a drum, a surface temperature of which is cooled to 10 to 60° C., by an electrostatic force, cooled, and solidified to obtain a non-stretched film, and the non-stretched film is guided to a series of rolls heated to a temperature of 80 to 120° C., stretched by 2.0 to 5.0 times in a longitudinal direction, and cooled with a series of rolls of 20 to 50° C. Subsequently, the film stretched in a longitudinal direction was led to a tenter while grasping both ends of the film with clips, and was transversely stretched in a direction perpendicular to a longitudinal direction in an atmosphere heated to a temperature of 90 to 140° C. The film is stretched by 2.5 to 4.5 times in a longitudinal or transverse direction, but a ratio of area of the stretched film to original area (longitudinal draw ratio×transverse draw ratio) is preferably 9 to 16. When the ratio of area is less than 9, whiteness of the resulting film becomes poor, and when the ratio is more than 16, the film is apt to break in stretching and a film forming property tends to become poor. To impart planarity and dimensional stability to the film thus biaxially stretched, the film is subjected to heat setting at a temperature of 150 to 230° C. in the tenter and is slowly cooled uniformly to room temperature and wound to obtain a film.

Various additives may be added to the white film and/or the applied layer within the range of not impairing the effects. As the additives, for example, organic and/or inorganic fine particles, fluorescent brighteners, crosslinking agents, heat stabilizers, antioxidants, organic lubricants, antistatic agents, nucleating agents, dyes, fillers, dispersants, coupling agents and the like can be used.

In the white reflective plate, an average reflectance at a wavelength of 400 to 700 nm measured from a plane in which the applied layer is provided is preferably 85% or more, more preferably 87% or more, and particularly preferably 90% or more. When the average reflectance is less than 85%, some liquid crystal displays to which the white film is applied may be low in brightness. When the applied layer is provided on both sides of the white film, the average reflectance measured from any one of applied layers on both sides may be 85% or more.

When the applied layer is applied to a white film being a substrate, a coating solution may be applied by any method. The methods such as gravure coating, roller coating, spin coating, reverse coating, bar coating, screen coating, blade coating, air knife coating, and dipping may be employed.

Further, the coating solution for forming the applied layer may be applied (in line coating) concurrently with the production of the white film of a substrate may be used, or may be applied (off line coating) onto a white film in which the crystalline orientation has been completed.

The white reflective film thus obtained can realize an improvement in the brightness of the liquid crystal backlight, and in accordance with the further preferred aspect, the white reflective film can be favorably used as reflective plates for area light sources of edge-light and direct type for a liquid crystal screen and as reflectors since the reduction in reflectance is low even long-term use. When the white reflective film is used in these area light sources, it is installed with its applied layer directed to the light sources.

The white polyester film for a liquid crystal display reflective plate thus obtained has fine air bubbles formed within the film to achieve a high reflectance and can attain high brightness when it is used as a reflective plate of side light type liquid crystal displays and direct type liquid crystal displays.

Measurement of Properties and Method of Evaluation of Effect

Methods of evaluation of properties and methods of evaluation of effects are as follows.

(1) Spectral Reflectance

A reflectance in a case where an integrating sphere was attached to a spectrophotometer (U-3310) manufactured by Hitachi High-Technologies Corp. and a standard white plate (aluminum oxide) is taken as 100% is measured over a wavelength of 450 to 600 nm. The reflectance is read from the resulting chart at 5 nm intervals and this reflectance is taken as a spectral reflectance.

(2) Calculation Method of Wavelength Coefficient M and Estimated Reflectance R560

In the method, in at least one side (side A) of the film, the spectral reflectance at a wavelength range of 450 to 600 nm is measured. The wavelength dependency of spectral reflectance is approximated according to the following approximation formula R:

$$R = M \times \lambda + B,$$

by a least square method, based on spectral reflectance measured at 5 nm intervals to determine M (%/nm) and R560.

In the formula, R represents a light reflectance (%), $\lambda$ represents a wavelength of light (nm), M represents a wavelength coefficient (%/nm), B represents a constant (%), and R560 represents an estimated reflectance obtained by introducing $\lambda = 560$ nm into the approximation formula R (%).

(3) Apparent Specific Gravity

A film is cut into the size of 100 mm×100 mm, thicknesses of at least 10 points are measured with a measuring element with a dial gauge, and an average thickness d (μm) is calculated. Further, this film is weighed with a direct-reading balance to read out weight w (g) to an order of $10^{-4}$. Then, an apparent specific gravity=w/d×100 is calculated.

(4) Brightness of Screen (Side Light Type Brightness) (Table 1)

As shown in FIG. 1, a reflective film 12 of a backlight of VAIO (VGN-S52B/S) manufactured by SONY Corp. is changed to a prescribed film and the brightness is measured at a measuring distance of 850 mm with a luminance colorimeter 15 (BM-7 fast manufactured by Topcon Corp.). Measurement is performed three times and averaged. The brightness was rated according to the following criteria:

3000 cd/m$^2$ or more is excellent,
2950 cd/m$^2$ or more and less than 3000 cd/m$^2$ is good,
2900 cd/m$^2$ or more and less than 2950 cd/m$^2$ is acceptable,
and less than 2900 cd/m$^2$ is bad.

(5) Brightness of Screen (Direct type Brightness) (Table 1)

As shown in FIG. 3, a reflective film bonded in a backlight of 181BLM07 (manufactured by NEC Corp.) was changed to a prescribed film sample and a liquid crystal display was lit up. The film sample was held for one hour in this state to stabilize a light source, and a screen portion of a liquid crystal display was taken with a CCD camera (DXC-390 manufactured by SONY Corp.) and images were captured by an image analyzer EyeScale manufactured by I. System Corp. Thereafter, the brightness level of the taken images was controlled in 30000 steps and automatically detected and detected data was converted to brightness. The brightness was rated according to the following criteria:

5100 cd/m$^2$ or more is excellent,
5000 cd/m$^2$ or more and less than 5100 cd/m$^2$ is good,
4900 cd/m$^2$ or more and less than 5000 cd/m$^2$ is acceptable,
and less than 4900 cd/m$^2$ is bad.

(6) Gloss Level

The gloss level was measured at an incident angle of 60 degrees and an acceptance angle of 60 degrees according to JIS K 7105 with a digital variable gloss meter (UGU-4D) manufactured by SUGA TEST INSTRUMENTS Co., Ltd.

(7) Flaw of Light Guide Plate

As shown in FIG. 1, a reflective film 12 of a backlight of VAIO (VGN-S52B/S) manufactured by SONY Corp. was changed to a prescribed film and the prescribed film was brought into contact with the light guide plate 13, then the reflective film was removed, the surface of the light guide plate was observed, and the presence or absence of the flaw was visually identified.

As evaluations of the flaw of the light guide plate,
the light guide plate having no flaw is good,
the light guide plate having a few flaws is acceptable, and
the light guide plate having flaws and being at an impracticable level is bad.

(8) Screen Non-uniformity Due to Adhesion

As shown in FIG. 1, a reflective film 12 of a backlight of VAIO (VGN-S52B/S) manufactured by SONY Corp. was changed to a prescribed film and a liquid crystal display was lit up in this state. A metal plate on a backside of a liquid crystal display was removed, a back of the reflective plate was pressed with a forefinger, and the brightness unevenness of the screen at that time was visually identified.

As evaluations of the screen non-uniformity due to adhesion,
the display, in which the screen non-uniformity due to adhesion has not occurred, is excellent,
the display, in which the screen non-uniformity due to adhesion has occurred but an area of the screen non-uniformity is less than 2 mm×2 mm, is good,
the display, in which the screen non-uniformity due to adhesion has occurred but an area of the screen non-uniformity is 2 mm×2 mm or more and less than 5 mm×5 mm, is acceptable, and
the display, in which the screen non-uniformity due to adhesion has occurred but an area of the screen non-uniformity is 5 mm×5 mm or more, is bad.

The area of the screen non-uniformity indicates a region where the distribution of the screen brightness is uneven and a region which looks like bright whitish portion over the backlight, due to its adhesion to the light guide plate.

(9) Average Particle Size of Inorganic Particle and/or Organic Particle in Film

Using a transmission electron microscope Model HU-12 (manufactured by Hitachi Ltd.), cross sections of the layer A and/or the Layer C were observed at an observation magnification of 100000 times and to determine particle sizes from the photographs of the cross section. That is, an outline of a particle portion in the cross section photograph was traced, this particle portion was image-processed with a high-definition image analysis apparatus PIAS-IV (a manufactured by PIAS Corp.), images of 100 particles in a measuring field were converted to an equivalent circle to determine a number average particle size, and this number average particle size was taken as an average particle size of the inorganic and/or organic particles.

(10) Measuring Method of Amount of Catalyst (ICP-OES Method))

0.1 g (part) of the film sample was weighed out in a platinum crucible, and carbonized and incinerated with a gas burner, and the resulting residue was subjected to a fusion treatment by sodium carbonate-boric acid and then dissolved in diluted nitric acid. Insoluble matter was separated by filtration and incinerated, and was subjected to a heat fusion treatment by phosphoric acid and then dissolved in diluted nitric acid. This solution was analyzed using an ICP optical emission spectrometry apparatus (manufactured by SII NanoTechnology Inc., SPS 3100 (sequential type), and manufactured by PerkinElmer Co., Ltd., Optima 4300 DV (multi-type)).

(11) Content of Spherical Particle in Applied Layer

When the content of the spherical particle in the applied layer is unknown, it is determined according the following procedure:
  (i) The applied layer of the white reflective film is shaved off by a sharp knife, 0.05 g of the applied layer is sampled from the white film, and a binder resin component is extracted from this sample by using an organic solvent.
  (ii) A substance which is not dissolved in the organic solvent is considered as spherical particles, weight A (g) of the spherical particles is weighed, and a value calculated by the following equation is taken as "a content of spherical particles":

Content of spherical particle (% by weight)=weight $A$ (g) of spherical particles/0.05 (g)×100

(12) Refractive Index of Binder Resin and Refractive Index of Spherical Particle in Applied Layer When the refractive indexes of the binder resin and the spherical particle are unknown, they are determined according the following procedure:
  (i) A binder resin is extracted from an applied layer by using an organic solvent and the organic solvent is distilled off, and then a refractive index of light is measured at 25° C. at a wavelength of 589.3 nm with an ellipsometry method. Values obtained by this measurement are taken as "a refractive index of a binder resin."
  (ii) The applied layer of a white reflective film is immersed in an organic solvent, the applied layer is peeled off from the white reflective film, and then the applied layer is pressed against a slide glass and slid on the slide glass to exfoliate spherical particles from the applied layer. A refractive index of the obtained spherical particle is determined according to a Becke's line detection method. Specifically, the particle is put in a liquid organic compound, the particle in the liquid organic compound is observed at various liquid temperatures at which a refractive index of the liquid is known, and the refractive index of the liquid organic compound at the time when the outline of the particle cannot be recognized is taken as "a refractive index of a spherical particle."

(13) Volume Average Particle Size and Coefficient of Variation CV of Spherical Particles A volume average particle size and a coefficient of variation CV of the spherical particles sampled in (11) were measured using Coulter Multisizer III (manufactured by Beckman Coulter, Inc.) as a particle size distribution measuring apparatus utilizing a pore electric resistance method. Number of particles and a particle volume were measured by measuring electric resistance of an electrolyte fraction corresponding to a volume of particles at the time when the particles pass through the pores. First, a trace amount of samples were dispersed in a dilute aqueous solution of a surfactant, then this dispersion was added to a container of a designated electrolyte by a quantity in which a percentage of passing through an aperture (pore at detection section) was 10 to 20% while monitoring the display, measurement of a particle size was continued until number of particles passing through the pore reached 100000, and data was automatically calculated to determine a volume average particle size, and a standard deviation and a coefficient of variation of the volume average particle size. The coefficient of variation can be calculated from the following formula:

Coefficient of variation CV (%)=standard deviation (μm) of volume average particle size×100/volume average particle size (μm)

(14) Degree of Yellow (b Value)

Using a SM color computer (manufactured by Suga Test Instruments Co., Ltd.), a b value representing a degree of yellow was determined by a reflection measuring method with a C/2° light source. b values of three samples were calculated and this was taken as a degree of yellow.

(15) Light Resistance (Change in Yellowing)

After a forced ultraviolet ray irradiation test was carried out under the following conditions using an accelerated UV testing apparatus EYE Super UV Tester SUV-W131 (manufactured by IWASAKI ELECTRIC Co., Ltd.), a b value was determined. An accelerated test was carried out on 3 samples, then b values before and after the test were measured, and an average of differences between before test and after test was taken as light resistance (change rate in yellowing).

"Ultraviolet Ray Irradiation Conditions"

Illumination: 100 mW/cm$^2$, temperature: 60° C., relative humidity: 50% RH, Illumination time: 48 hours The results of evaluation of light resistance were rated according to the following criteria, and Class A and Class B were considered as acceptance:
  Class A: Change Rate in Yellowing is less than 5,
  Class B: Change Rate in Yellowing is not less than 5 and less than 15,
  Class C: Change Rate in Yellowing is not less than 15.

(16) Average Brightness (Table 2)

Using a 21-inch direct type backlight (lamp tube diameter: 3 mm, number of lamps: 12, distance between lamps: 25 mm, distance between a reflective film and a lamp center: 4.5 mm, distance between a diffusion plate and a lamp center: 13.5 mm), the brightness of optical sheet constitutions of the following two models was measured. The diffusion plate was located closer to the light source than an optical sheet in both cases:
  Model 1: diffusion plate RM803 (manufactured by Sumitomo Chemical Co., Ltd., thickness 2 mm)/diffusion sheet GM3 (manufactured by KIMOTO Co., Ltd., thickness 100 μm) 2 sheets,
  Model 2: diffusion plate RM803 (manufactured by Sumitomo Chemical Co., Ltd., thickness 2 mm)/diffusion sheet GM3 (manufactured by KIMOTO Co., Ltd., thickness 100 μm)/prism sheet BEF-II (manufactured by Sumitomo 3M Ltd., thickness 130 μm)/polarized light separation sheet DBEF (manufactured by Sumitomo 3M Ltd., thickness 400 μm).

In measurement of brightness, a cold cathode ray tube lamp was lit up for 60 minutes to stabilize a light source and then brightness (cd/m$^2$) was measured using a luminance colorimeter model BM-7 fast (manufactured by TOPCON Corp.). An average value of brightness of three samples was determined and this average value was taken as average brightness.

EXAMPLES

The films and methods will also be described based on examples.

Example 1

Using polyethylene terephthalate where a total amount of Sb, K, P, Mg, Li, Ca, Ge and Ti compounds, catalysts used in polymerization of polyethylene terephthalate, was 2.985 moles per 1 ton of polyethylene terephthalate and which was formed by polymerizing polyethylene glycol having a molecular weight of 4000 has an L value of 62.8 and a b value of 0.5 in color tone (according to JIS K 7105) as well as a haze value of 0.2%, 65 parts by weight of polyethylene terephthalate, 5 parts by weight of a copolymer of polybutylene terephthalate and polytetramethylene glycol (PBT/PTMG) (trade name: Hytrel manufactured by DU PONT-TORAY Co., Ltd.), 10 parts by weight of a copolymer formed by copolymerizing polyethylene terephthalate, 10 mol % of isophthalic acid and 5 mol % of polyethylene glycol having a molecular weight of 1000 (PET/I/PEG), and 20 parts by weight of polymethylpentene were prepared and mixed, and the resulting mixture was dried at 180° C. for 3 hours and then supplied (layer B) to an extruder B heated to a temperature of 270 to 300° C.

On the other hand, 1 part by weight of 2% by weight master chips of silicon dioxide (containing silicon dioxide in an amount of 2% by weight with respect to the total amount of the master chips) having a number average particle size of 4 μm and 1 part by weight of 2% by weight master chips of silicon dioxide having a number average particle size of 2 μm were added to 98 parts by weight of chips of polyethylene terephthalate, the resulting mixture was dried in a vacuum at 180° C. for 3 hours and then supplied (layer A) to an extruder A heated to 280° C., and these polymers were laminated through a laminating apparatus in such a way that these polymers have a constitution of layer A/layer B/layer A and a ratio of these three layers extruded was 1:12:1, and extruded into a sheet form from a T-die. Furthermore, a non-stretched film obtained by cooling and solidifying this film on a chill drum having a surface temperature of 25° C. was guided to a series of rolls heated to a temperature of 85 to 98° C., stretched by 3.4 times in a longitudinal direction, and cooled with a series of rolls of 21° C. Subsequently, the film stretched in a longitudinal direction was led to a tenter while grasping both ends of the film with clips, and stretched by 3.6 times in a direction perpendicular to a longitudinal direction under an atmosphere heated to 120° C. Thereafter, the film was subjected to heat setting at 190° C. in the tenter, and was slowly cooled uniformly to room temperature and wound to obtain a film having a thickness of 300 μm. The gloss level (60 degrees) of the resulting film was 122%. Properties as a substrate for a direct type liquid crystal display reflective plate are as shown in Table 1. High brightness was achieved in the direct type liquid crystal display.

Example 2

A film having a thickness of 300 μm was prepared by the same procedure as in Example 1 except for changing the composition of the polyester layer (A) to that described in Table 1. The gloss level (60 degrees) of the resulting film was 120%. Properties as a substrate for a direct type liquid crystal display reflective plate are as shown in Table 1. High brightness was achieved in the direct type liquid crystal display.

Example 3

A film having a thickness of 300 μm was prepared by the same procedure as in Example 1 except for changing the composition of the polyester layer (A) to that described in Table 1. The gloss level (60 degrees) of the resulting film was 42%. Properties as a substrate for a liquid crystal display reflective plate are as shown in Table 1. Very high brightness was achieved in the direct type liquid crystal display.

Example 4

A film having a thickness of 300 μm was prepared by the same procedure as in Example 1 except for changing the composition of the polyester layer (A) to that described in Table 1. The gloss level (60 degrees) of the resulting film was 55%. Properties as a substrate for a liquid crystal display reflective plate are as shown in Table 1. Very high brightness was achieved in the direct type liquid crystal display.

Example 5

A film having a thickness of 225 μm was prepared by the same procedure as in Example 1 except for changing the composition of the polyester layer (A) to that described in Table 1. The gloss level (60 degrees) of the resulting film was 56%. Properties as a substrate for a liquid crystal display reflective plate are as shown in Table 1. Very high brightness was achieved in the edge light type liquid crystal display and the direct type liquid crystal display.

Example 6

A film having a thickness of 250 μm was prepared by the same procedure as in Example 1 except for changing the compositions of the polyester layers (A) and (B) to those described in Table 1. The gloss level (60 degrees) of the resulting film was 113%. Properties as a substrate for a side light type and a direct type liquid crystal display reflective plates are as shown in Table 1. There was no flaw on the light guide plate and screen non-uniformity due to adhesion was not produced. Further, very high brightness was achieved in the edge light type liquid crystal display and the direct type liquid crystal display.

Example 7

A film having a thickness of 300 μm was prepared by the same procedure as in Example 1 except for changing the composition of the polyester layer (A) to that described in Table 1 and changing the lamination constitution of the layer A and the layer B from a three-layer to a two-layer. The gloss level (60 degrees) of the resulting film was 120%. Properties as a substrate for a side light type and a direct type liquid crystal display reflective plates are as shown in Table 1. There are a few flaws on the light guide plate but this film can be used in the application of the direct type liquid crystal display.

Further, high brightness was achieved in the side light type liquid crystal display and the direct type liquid crystal display.

Example 8

A film having a thickness of 225 μm was prepared by the same procedure as in Example 1 except for changing the compositions of the polyester layers (A) and (B) to those described in Table 1. The gloss level (60 degrees) of the resulting film was 114%. Properties as a substrate for a side light type and a direct type liquid crystal display reflective plates are as shown in Table 1. There was no flaw on the light guide plate, screen non-uniformity due to adhesion was not produced, and very high brightness was achieved.

Example 9

A film having a thickness of 250 μm was prepared by the same procedure as in Example 1 except for changing the composition of the polyester layer (A) to that described in Table 1. The gloss level (60 degrees) of the resulting film was 115%. Properties as a substrate for a side light type and a direct type liquid crystal display reflective plates are as shown in Table 1. There was no flaw on the light guide plate, a degree of screen non-uniformity due to adhesion was low, and high brightness was achieved in the edge light type liquid crystal display and the direct type liquid crystal display.

Comparative Example 1

A film having a thickness of 188 μm was prepared by the same procedure as in Example 1 except for changing the compositions of the polyester layers (A) and (B) to those described in Table 1. The gloss level (60 degrees) of the resulting film was 104%. Properties as a substrate for a side light type and a direct type liquid crystal display reflective plates are as shown in Table 1. There was no flaw on the light guide plate, screen non-uniformity due to adhesion was not produced, and high brightness was achieved in the edge light type liquid crystal display and the direct type liquid crystal display.

Comparative Example 2

A film having a thickness of 188 μm was prepared by the same procedure as in Example 1 except for changing the composition of the polyester layer (A) and a thickness of the film to those described in Table 1. The gloss level (60 degrees) of the resulting film was 48%. Properties as a substrate for a side light type and a direct type liquid crystal display reflective plates are as shown in Table 1. A level of the flaw of the light guide plate was impracticable but screen non-uniformity due to adhesion was not produced. High brightness was not achieved in the edge light type liquid crystal display nor the direct type liquid crystal display.

Comparative Example 3

A film having a thickness of 300 μm was prepared by the same procedure as in Example 1 except for changing the composition of the polyester layer (A) to that described in Table 1. The gloss level (60 degrees) of the resulting film was 99%. Properties as a substrate for a side light type and a direct type liquid crystal display reflective plates are as shown in Table 1. The flaw of the light guide plate was no problem but screen non-uniformity due to adhesion was found. High brightness was not achieved in the side light type liquid crystal display nor the direct type liquid crystal display.

Comparative Example 4

A film having a thickness of 250 μm was prepared by the same procedure as in Comparative Example 1 except for changing the compositions of the polyester layers (A) and (B) and a thickness of the film to those described in Table 1. The gloss level (60 degrees) of the resulting film was 27%. Properties as a substrate for a side light type and a direct type liquid crystal display reflective plates are as shown in Table 1. A level of the flaw of the light guide plate was impracticable but screen non-uniformity due to adhesion was not found. High brightness was not achieved in the side light type liquid crystal display nor the direct type liquid crystal display.

Comparative Example 5

A film having a thickness of 188 μm was prepared by the same procedure as in Example 1 except for changing the compositions of the polyester layers (A) and (B) and a thickness of the film to those described in Table 1. The gloss level (60 degrees) of the resulting film was 26%. Properties as a substrate for a side light type and a direct type liquid crystal display reflective plates are as shown in Table 1. A level of the flaw of the light guide plate was impracticable but screen non-uniformity due to adhesion was not found. High brightness was not achieved in the side light type liquid crystal display nor the direct type liquid crystal display.

Comparative Example 6

A film having a thickness of 100 μM was prepared by the same procedure as in Example 1 except for adjusting the composition of the polyester layer (A) so as to have the same composition as that of the polyester layer (B) and changing a thickness of the film to that described in Table 1. The gloss level (60 degrees) of the resulting film was 35%. Properties as a substrate for a side light type and a direct type liquid crystal display reflective plates are as shown in Table 1. A level of the flaw of the light guide plate was impracticable but screen non-uniformity due to adhesion was not found. High brightness was not achieved in the side light type liquid crystal display nor the direct type liquid crystal display.

TABLE 1

| | | Example | | | | | | | | |
|---|---|---|---|---|---|---|---|---|---|---|
| | | 1 | 2 | 3 | 4 | 5 | 6 | 7 | 8 |
| | | | | | | Lamination constitution | | | | |
| | Unit | A/B/A | → | → | → | → | → | A/B | A/B/A |
| Base material | | | | | | | | | | |
| PET (layer A) | Parts by weight | 99.55 | 99.85 | 92.9 | 86 | 86 | 99.91 | 99.91 | 99.91 |
| Catalyst amount (per 1 ton of PET) | mol/t | 2.985 | 2.563 | 3.178 | 3.281 | 3.291 | 3.308 | 3.346 | 3.346 |
| Haze | | 0.2 | 0.2 | 0.2 | 0.2 | 0.2 | 0.2 | 0.2 | 0.7 |

TABLE 1-continued

| | | | | | | | | | | |
|---|---|---|---|---|---|---|---|---|---|---|
| L value | | | 62.8 | 62.8 | 60.3 | 60.3 | 60.3 | 60.3 | 60.3 | 55.7 |
| b value | | | 0.5 | 0.5 | 4.1 | 4.1 | 4.1 | 4.1 | 4.1 | 8.2 |
| Material of layer A | | | | | | | | | | |
| Inorganic and/or oganic particles | Silicon dioxide | Parts by weight | — | — | — | — | — | 0.06 | 0.06 | 0.06 |
| | | Particle size | — | — | — | — | — | 4 | 6 | 4 |
| | Silicon dioxide | Parts by weight | 0.02 | 0.02 | — | — | — | 0.02 | 0.02 | 0.02 |
| | | Particle size | 2 | 2 | — | — | — | 2 | 2 | 2 |
| | Calcium carbonate | Parts by weight | — | — | 7 | — | — | — | — | — |
| | | Particle size | — | — | 1 | — | — | — | — | — |
| | Titanium dioxide | Parts by weight | — | — | — | — | — | — | — | — |
| | | Particle size | — | — | — | — | — | — | — | — |
| | Barium sulfate | Parts by weight | — | — | — | 14 | 14 | — | — | — |
| | | Particle size | — | — | — | 1 | 1 | — | — | — |
| | Total particle weight | Parts by weight | 0.02 | 0.02 | 7 | 14 | 14 | 0.08 | 0.08 | 0.08 |
| Material of layer B | | | | | | | | | | |
| Thermoplastic elastomer | PET | Parts by weight | 65 | 65 | 65 | 65 | 65 | 68 | 65 | 70 |
| | PET/I/PEG copolymer | Parts by weight | 10 | 10 | 10 | 10 | 10 | 10 | 10 | 10 |
| | PBT/PTMG copolymer | Parts by weight | 5 | 5 | 5 | 5 | 5 | 5 | 5 | 5 |
| | PMP | Parts by weight | 20 | 20 | 20 | 20 | 20 | 17 | 20 | 15 |
| Properties | | | | | | | | | | |
| Film thickness | | μm | 300 | 300 | 300 | 300 | 225 | 250 | 300 | 225 |
| R560 (reflectance at 560 nm) | | % | 105.7 | 105.8 | 103.4 | 104.4 | 104.8 | 105.2 | 107 | 104.8 |
| Apparent specific gravity | | g/cm³ | 0.61 | 0.60 | 0.62 | 0.61 | 0.6 | 0.62 | 0.55 | 0.77 |
| Gloss level of layer A | | % | 122 | 120 | 42 | 55 | 56 | 113 | 120 | 114 |
| Evaluation results | | | | | | | | | | |
| Approximation formula | Wavelength coefficient M | %/nm | −0.0158 | −0.0245 | −0.0164 | −0.0155 | −0.0154 | −0.0147 | −0.0150 | −0.0123 |
| Side light type | Flaw of light guide plate | — | — | — | — | — | — | Good | Acceptable | Good |
| | Screen non-uniformity due to adhesion | — | — | — | — | — | — | Excellent | Excellent | Excellent |
| | Brightness (reverse prism type) | cd/m² | — | — | — | — | 3045 Excellent | 3050 Excellent | 3060 Excellent | 3040 Excellent |
| | Brightness (normal prism type) | cd/m² | — | — | — | — | 3180 Excellent | 3095 Excellent | 3065 Excellent | 3035 Excellent |
| Downright type | Brightness | cd/m² | 5156 Excellent | 5166 Excellent | 5141 Excellent | 5252 Excellent | 5191 Excellent | 5020 Good | 5080 Good | 5100 Excellent |

| | | | Example | Comparative Example | | | | | |
|---|---|---|---|---|---|---|---|---|---|
| | | | 9 | 1 | 2 | 3 | 4 | 5 | 6 |
| | | | Lamination constitution | | | | | | |
| | | Unit | → | → | → | → | → | → | → |
| Base material | | | | | | | | | |
| PET (layer A) | | Parts by weight | 99.91 | 99.91 | 92.9 | 94.9 | 85.9 | 85.9 | 86 |
| Catalyst amount (per 1 ton of PET) | | mol/t | 3.346 | 3.504 | 3.504 | 3.504 | 3.552 | 3.693 | 5.089 |
| Haze | | | 0.7 | 0.7 | 0.7 | 0.7 | 0.7 | 0.7 | 0.7 |
| L value | | | 55.7 | 55.7 | 55.7 | 55.7 | 55.7 | 55.7 | 55.7 |
| b value | | | 8.2 | 8.2 | 8.2 | 8.2 | 8.2 | 8.2 | 8.2 |
| Material of layer A | | | | | | | | | |
| Inorganic and/or oganic particles | Silicon dioxide | Parts by weight | 0.06 | 0.06 | — | — | — | — | — |
| | | Particle size | 4 | 4 | — | — | — | — | — |
| | Silicon dioxide | Parts by weight | 0.02 | 0.02 | — | — | — | — | — |
| | | Particle size | 2 | 2 | — | — | — | — | — |
| | Calcium carbonate | Parts by weight | — | — | 7 | — | 14 | 14 | — |
| | | Particle size | — | — | 1 | — | 1 | 1 | — |
| | Titanium dioxide | Parts by weight | — | — | — | 5 | — | — | 14 |
| | | Particle size | — | — | — | 0.25 | — | — | 0.25 |
| | Barium sulfate | Parts by weight | — | — | — | — | — | — | — |
| | | Particle size | — | — | — | — | — | — | — |
| | Total particle weight | Parts by weight | 0.08 | 0.08 | 7 | 5 | 14 | 14 | 14 |

TABLE 1-continued

| Material of layer B | | | | | | | | | |
|---|---|---|---|---|---|---|---|---|---|
| Thermo-plastic elastomer | PET | Parts by weight | 70 | 70 | 65 | 65 | 70 | 90 | 86 |
| | PET/I/PEG copolymer | Parts by weight | 10 | 10 | 10 | 10 | 10 | — | — |
| | PBT/PTMG copolymer | Parts by weight | 5 | 5 | 5 | 5 | 5 | — | — |
| | PMP | Parts by weight | 15 | 15 | 20 | 20 | 15 | 10 | — |
| Properties | | | | | | | | | |
| Film thickness | | μm | 250 | 188 | 188 | 300 | 250 | 188 | 100 |
| R560 (reflectance at 560 nm) | | % | 105.3 | 104 | 103 | 101.6 | 101 | 97.7 | 93.3 |
| Apparent specific gravity | | g/cm$^3$ | 0.78 | 0.76 | 0.6 | 0.63 | 0.76 | 0.84 | 1.48 |
| Gloss level of layer A | | % | 115 | 113 | 48 | 99 | 27 | 26 | 35 |
| Evaluation results | | | | | | | | | |
| Approximation formula | Wavelength coefficient M | %/nm | −0.0113 | −0.0141 | −0.0108 | −0.0081 | −0.0068 | −0.0094 | −0.0163 |
| Side light type | Flaw of light guide plate | — | Good | Good | Bad | Good | Bad | Bad | Bad |
| | Screen non-uniformity due to adhesion | — | Good | Excellent | Excellent | Acceptable | Excellent | Excellent | Good |
| | Brightness (reverse prism type) | cd/m$^2$ | 3030 Good | 2995 Good | 2870 Bad | 2780 Bad | 2905 Acceptable | 2700 Bad | 2510 Bad |
| | Brightness (normal prism type) | cd/m$^2$ | 3025 Excellent | 2990 Good | 2945 Acceptable | 2895 Bad | 2910 Acceptable | 2750 Bad | 2565 Bad |
| Downright type | Brightness | cd/m$^2$ | 5080 Good | 5000 Good | 4910 Acceptable | 4790 Bad | 4920 Acceptable | 4750 Bad | 4430 Bad |

| | | |
|---|---|---|
| Flaw of light guide plate | Bad | Impracticable |
| | Acceptable | There are a few flaws but practicable |
| | Good | No flaw |
| Screen non-uniformity due to adhesion | Bad | Area of non-uniformity: 5 mm × 5 mm or more |
| | Acceptable | Area of non-uniformity: 2 mm × 2 mm or more and less than 5 mm × 5 mm |
| | Good | Area of non-uniformity: less than 2 mm × 2 mm |
| | Excellent | Area of non-uniformity: not occur |
| Evaluation of Side Light Type Brightness (cd/cm$^2$) | Less than 2900 | Bad |
| | 2900 or more and less than 2950 | Acceptable |
| | 2950 or more and less than 3000 | Good |
| | 3000 or more | Excellent |
| Evaluation of Downright Type Brightness (cd/cm$^2$) | Less than 4900 | Bad |
| | 4900 or more and less than 5000 | Acceptable |
| | 5000 or more and less than 5100 | Good |
| | 5100 or more | Excellent |

Example 10

A coating solution, formed by adding 10.0 parts by weight of HALSHYBRID (registered trademark) UV-G13 (acrylic copolymer, solution having a concentration of 40%, refractive index 1.49, manufactured by NIPPON SHOKUBAI CO., LTD.), 9.9 parts by weight of ethyl acetate, and 0.45 parts by weight of nonporous acrylic particles (manufactured by SEKISUI PLASTICS Co., Ltd., TECHPOLYMER (registered trademark) SSX series, SSX-105, refractive index 1.49, volume average particle size 5.0 μm, coefficient of variation CV 9%, acrylic copolymer, crosslinked, without an ultraviolet absorber and a light stabilizer) as a spherical particle while stirring a mixture, was prepared. This coating solution was applied onto one surface of the polyester film of Example 8 with a coating bar No. 12 manufactured by Metava corporation and dried at 120° C. for one minute to obtain a white film on which 4.0 g/m$^2$ of the coating solution was applied.

Example 11

A coating solution, formed by adding 10.0 parts by weight of HALSHYBRID (registered trademark) UV-G13 (acrylic copolymer, solution having a concentration of 40%, refractive index 1.49, manufactured by NIPPON SHOKUBAI CO., LTD.), 14.5 parts by weight of ethyl acetate, and 1.75 parts by weight of nonporous acrylic particles (manufactured by SEKISUI PLASTICS Co., Ltd., TECHPOLYMER (registered trademark) SSX series, SSX-105, refractive index 1.49, volume average particle size 5.0 μm, coefficient of variation CV 9%, acrylic copolymer, crosslinked, without an ultraviolet absorber and a light stabilizer) as a spherical particle while stirring a mixture, was prepared. This coating solution was applied onto one surface of the polyester film of Example 8 with a coating bar No. 12 manufactured by Metava corporation and dried at 120° C. for one minute to obtain a white film on which 4.0 g/m$^2$ of the coating solution was applied.

Example 12

A white film, on which 4.0 g/m$^2$ of the coating solution was applied, was prepared by the same procedure as in Example 11 except for using the polyester film of Example 1.

Example 13

A coating solution, formed by adding 10.0 parts by weight of HALSHYBRID (registered trademark) UV-G13 (acrylic copolymer, solution having a concentration of 40%, refractive index 1.49, manufactured by NIPPON SHOKUBAI CO., LTD.), 14.5 parts by weight of ethyl acetate, and 1.75 parts by weight of nonporous acrylic particles (manufactured by SEKISUI PLASTICS Co., Ltd., TECHPOLYMER (registered trademark) SSX series, SSX-105, refractive index 1.49, volume average particle size 5.0 μm, coefficient of variation CV 9%, acrylic copolymer, crosslinked, without an ultraviolet absorber and a light stabilizer) as a spherical particle while stirring a mixture, was prepared. This coating solution was applied onto one surface of the polyester film of Example 8 with a coating bar No. 12 manufactured by Metava corporation to obtain a white film on which 4.0 g/m² of the coating solution was applied.

Example 14

A white film, on which 4.0 g/m² of the coating solution was applied, was prepared by the same procedure as in Example 11 except for using nonporous acrylic particles (manufactured by SEKISUI PLASTICS Co., Ltd., TECHPOLYMER (registered trademark) SSX-102, refractive index 1.49, volume average particle size 2.5 μm, coefficient of variation CV 10%, acrylic copolymer, crosslinked, without an ultraviolet absorber and a light stabilizer) as a spherical particle.

Example 15

A white film, on which 4.0 g/m² of the coating solution was applied, was prepared by the same procedure as in Example 11 except for using nonporous acrylic particles (manufactured by SEKISUI PLASTICS Co., Ltd., TECHPOLYMER (registered trademark) MBX series, XX-09FP, refractive index 1.49, volume average particle size 5.0 μm, coefficient of variation CV 27%, acrylic copolymer, crosslinked, without an ultraviolet absorber and a light stabilizer) as a spherical particle.

Example 16

A white film, on which 4.0 g/m² of the coating solution was applied, was prepared by the same procedure as in Example 11 except for using nonporous acrylic particles (manufactured by SEKISUI PLASTICS Co., Ltd., TECHPOLYMER (registered trademark) MBX series, MB30X-8, refractive index 1.49, volume average particle size 8.0 μm, coefficient of variation CV 32%, acrylic copolymer, crosslinked, without an ultraviolet absorber and a light stabilizer) as a spherical particle.

Example 17

A white film, on which 4.0 g/m² of the coating solution was applied, was prepared by the same procedure as in Example 11 except for using porous acrylic particles (manufactured by SEKISUI PLASTICS Co., Ltd., TECHPOLYMER (registered trademark) MBP series, MBP-8, refractive index 1.49, volume average particle size 8.0 μm, coefficient of variation CV 44%, acrylic copolymer, crosslinked, without an ultraviolet absorber and a light stabilizer) as a sphereical particle.

Example 18

Into a 1000 ml four necked flask equipped with a stirring apparatus, a thermometer and a nitrogen gas inlet tube, 70 parts by weight of methyl methacrylate, 10 parts by weight of trimethylolpropane triacrylate as a polyfunctional monomer to form a crosslinking structure, 3 parts by weight of 2,2,6,6-tetramethyl-4-piperidylmethacrylate as a hindered amine-based polymerizable compound, 10 parts by weight of 2-(2'-hydroxy-5'-methacryloxyethylphenyl)-2H-benzotriazole as a benzotriazole-based polymerizable compound, and 1 part by weight of lauroyl peroxide as a polymerization initiator were charged. Further, 1 part by weight of polyvinyl alcohol (PVA 224, manufactured by KURARAY Co., Ltd.) as a dispersion stabilizer of this solution and 200 parts by weight of water were added. This mixture was stirred at a rotating speed of 9000 rpm for 3 minutes with a homogenizer to disperse the polymerizable compound in water. Next, this dispersion was heated to 75° C. and maintained at this temperature for 2 hours to be reacted, and the dispersion was further heated to 90° C. to be reacted for 3 hours.

After performing the reaction described above, the dispersion was cooled to room temperature and filtrated with a mesh filter having an opening of 40 μm to eliminate flocculated substances. There was no flocculated substance in the resulting dispersion and the filtration of the dispersion was very excellent.

The resin particles dispersed in the dispersion thus filtrated have a volume average particle size of 6.4 μm and this resin particle was completely spherical.

Thus, the dispersion of the resin particles was washed according to a normal method and then filtrated to separate the resin particles from a dispersion medium, and separated resin particles were dried and classified to obtain spherical particles A (coefficient of variation CV 15%).

A coating solution, formed by adding 10.0 parts by weight of HALSHYBRID (registered trademark) UV-G13 (acrylic copolymer, solution having a concentration of 40%, refractive index 1.49, manufactured by NIPPON SHOKUBAI CO., LTD.), 11.9 parts by weight of ethyl acetate, and 1.0 part by weight of spherical particles A (refractive index 1.49, average particle size 6.4 μm, coefficient of variation CV 15%, acrylic copolymer, crosslinked, ultraviolet absorber: benzotriazole, light stabilizer: hindered amine) while stirring a mixture, was prepared. This coating solution was applied onto one surface of the polyester film of Example 8 with a coating bar No. 12 manufactured by Metava corporation and dried at 120° C. for one minute to obtain a white film on which 4.0 g/m² of the coating solution was applied.

Example 19

A white film, on which 4.0 g/m² of the coating solution was applied, was prepared by the same procedure as in Example 18 except for using nonporous silicon oxide (silica) particles (manufactured by FUSO CHEMICAL Co., Ltd., QUARTRON (registered trademark) SP series, SP-3C, refractive index 1.45, volume average particle size 3.0 μm, coefficient of variation CV 16%, crosslinked, without an ultraviolet absorber and a light stabilizer) as a spherical particle.

Example 20

A white film, on which 4.0 g/m² of the coating solution was applied, was prepared by the same procedure as in Example 18 except for using nonporous silicone particles (manufactured by GE-Toshiba Silicone Co., Ltd., Tospearl (registered trademark), Tospearl 145, refractive index 1.42, volume average particle size 4.5 μm, coefficient of variation CV 12%, crosslinked, without an ultraviolet absorber and a light stabilizer) as a spherical particle.

Example 21

A white film, on which 4.0 g/m² of the coating solution was applied, was prepared by the same procedure as in Example 18 except for using nonporous polystyrene particles (manufactured by SEKISUI PLASTICS Co., Ltd., TECHPOLYMER (registered trademark) SBX series, SBX-8, refractive index 1.59, volume average particle size 8.0 μm, coefficient of variation CV 37%, styrene copolymer, crosslinked, without an ultraviolet absorber and a light stabilizer) as a spherical particle.

Comparative Example 7

On the polyester film of Comparative Example 3, an evaluation of light resistance and measurement of the brightness were performed without providing an applied layer.

Comparative Example 8

On the polyester film of Comparative Example 3, an evaluation of light resistance and measurement of the brightness were performed without providing an applied layer.

Comparative Example 9

A coating solution, formed by adding 10.0 parts by weight of HALSHYBRID (registered trademark) UV-G13 (acrylic copolymer, solution having a concentration of 40%, refractive index 1.49, manufactured by NIPPON SHOKUBAI CO., LTD.) and 18.9 parts by weight of toluene while stirring a mixture, was prepared. This coating solution was applied onto one surface of the polyester film of Comparative Example 4 with a coating bar No. 12 manufactured by Metava corporation and dried at 120° C. for one minute to obtain a white film on which 4.0 g/m$^2$ of only the binder resin was applied.

Comparative Example 10

Nonporous benzoguanamine-formaldehyde condensate particles (manufactured by NIPPON SHOKUBAI CO., LTD., EPOSTAR (registered trademark), EPOSTAR M05, refractive index 1.66, volume average particle size 5.2 μm, coefficient of variation CV 35%, polyamide resin particle, crosslinked, without an ultraviolet absorber and a light stabilizer) was used as a spherical particle and this coating solution was applied onto one surface of the polyester film of Comparative Example 4 with a coating bar No. 12 manufactured by Metava corporation and dried at 120° C. for one minute to obtain a white film on which 4.0 g/m$^2$ of the coating solution was applied.

Comparative Example 11

Nonporous silica particles (manufactured by FUJI SILYSIA CHEMICAL Ltd. SYLOPHOBIC 100 (registered trademark), refractive index 1.45, volume average particle size 2.5 μm, coefficient of variation CV 49%, polyamide resin particle, crosslinked, without an ultraviolet absorber and a light stabilizer) was used as an amorphous spherical particle and this coating solution was applied onto one surface of the polyester film of Comparative Example 4 with a coating bar No. 12 manufactured by Metava corporation and dried at 120° C. for one minute to obtain a white film on which 4.0 g/m$^2$ of the coating solution was applied.

TABLE 2

| | Types of spherical particle | Types of white film | Shape of spherical particle | Difference in refractive indexes between binder and particle | Pore of spherical particle | Coefficient of variation CV of spherical particle (%) | Volume average particle size of spherical particle (μm) | Content of sphercial particle in applied layer (% by weight) | Light resistance | Brightness (%) Model 1 | Brightness (%) Model 2 |
|---|---|---|---|---|---|---|---|---|---|---|---|
| Example 10 | Acrylic | Example 8 | Spherical | 0.00 | Nonporous | 9 | 5.0 | 10 | A | 6820 | 4510 |
| Example 11 | Acrylic | Example 8 | Spherical | 0.00 | Nonporous | 9 | 5.0 | 30 | A | 6870 | 4550 |
| Example 12 | Acrylic | Example 1 | Spherical | 0.00 | Nonporous | 9 | 5.0 | 30 | A | 7020 | 4710 |
| Example 13 | Acrylic | Example 8 | Spherical | 0.00 | Nonporous | 9 | 5.0 | 50 | A | 6850 | 4540 |
| Example 14 | Acrylic | Example 8 | Spherical | 0.00 | Nonporous | 10 | 2.5 | 30 | A | 6860 | 4540 |
| Example 15 | Acrylic | Example 8 | Spherical | 0.00 | Nonporous | 27 | 5.0 | 30 | A | 6830 | 4520 |
| Example 16 | Acrylic | Example 8 | Spherical | 0.00 | Nonporous | 32 | 5.0 | 30 | A | 6810 | 4505 |
| Example 17 | Acrylic | Example 8 | Spherical | 0.00 | Porous | 44 | 8.0 | 30 | B | 6810 | 4505 |
| Example 18 | Spherical particle A | Example 8 | Spherical | 0.00 | Nonporous | 15 | 6.4 | 20 | A | 6860 | 4540 |
| Example 19 | Silicon oxide | Example 8 | Spherical | 0.04 | Nonporous | 16 | 3.0 | 20 | A | 6840 | 4530 |
| Example 20 | Silicone | Example 8 | Spherical | 0.07 | Nonporous | 12 | 4.5 | 20 | B | 6830 | 4520 |
| Example 21 | Polystyrene | Example 8 | Spherical | 0.10 | Nonporous | 37 | 8.0 | 20 | B | 6810 | 4510 |
| Comparative Example 7 | — | Comparative Example 3 | — | — | — | — | — | — | C | 6800 | 4500 |
| Comparative Example 8 | — | Comparative Example 3 | — | — | — | — | — | — | C | 6920 | 4640 |
| Comparative Example 9 | — | Comparative Example 4 | — | — | — | — | — | — | A | 6790 | 4500 |
| Comparative Example 10 | Benzaguanamine-formaldehyde condensate particle | Comparative Example 3 | Spherical | 0.17 | Nonporous | 37 | 5.2 | 20 | C | 6780 | 4470 |
| Comparative Example 11 | Silica | Comparative Example 3 | Amorphous | 0.04 | Nonporous | 49 | 2.5 | 20 | C | 6760 | 4450 |

There were effects of improving the brightness (that is, effects of improving the reflectance of a white reflective film itself) in all of Examples 10 to 21.

When comparing properties among Examples 18 to 21, it is found that if the difference in refractive indexes between the binder resin and the spherical particle is reduced, the brightness is improved.

When comparing properties among Examples 11, 15, 16, and Comparative Example 11, it is found that if the coefficient of variation of the spherical particle is reduced, the brightness is improved (comparison between Examples 11, 15, 16).

When comparing properties among Examples 10, 11, 13, it is found that even if the differences in refractive indexes and the coefficients of variation are the same, the brightness varies depending on the content of the spherical particle in the applied layer. When comparing properties between Examples 14 and 15, it is found that even if the differences in refractive indexes and the coefficients of variation are the same, the brightness varies depending on the a volume average particle size of the spherical particles.

Further, when a similar applied layer was provided on a white film, in which an addition amount of the particles in a surface layer was adjusted within a certain range, the brightness was further improved (Example 12).

When the coefficient of variation exceeded 30, improvement in the brightness was small even though the difference in refractive indexes between the resin binder and the spherical particle was 0.10 or less (Examples 16, 17).

When the porous particles were used, or silicone or polystyrene susceptible to yellowing was used, there was an improvement in the brightness, but the light resistance was slightly low (Examples 17, 20, 21).

When the applied layer was not provided, the light resistance was rejected (Comparative Examples 7, 8). When the spherical particles were not added or when the difference in refractive indexes between the resin binder and the spherical particle was more than 0.10, improvement in the brightness was not observed even though the applied layer was provided (Comparative Examples 9, 10).

The invention claimed is:

1. A white polyester film for a light reflective plate, having a thickness of 200 μm or more, wherein, in at least one side (side A) of the white polyester film, M is M<−0.0110 (%/nm) and R560≧100 (%) when the wavelength dependency of spectral reflectance at a wavelength of 450 to 600 nm is approximated according to the following approximation formula R:

$$R = M \times \lambda + B,$$

in which R is an approximation formula by a least square method and represents a light reflectance (%), λ represents a wavelength of light (nm), M represents a wavelength coefficient (%/nm), B represents a constant (%), and R560 represents an estimated reflectance obtained by introducing λ=560 into the approximation formula R (%).

2. The white polyester film according to claim 1, wherein a gloss level of the side A at an incident angle of 60 degrees is 100% or more.

3. The white polyester film according to claim 2, wherein a gloss level of the side (side B) opposite to the side A at an incident angle of 60 degrees is 70% or less.

4. The white polyester film according to claim 1, wherein a gloss level of the side (side B) opposite to the side A at an incident angle of 60 degrees is 70% or less.

5. A white polyester film for a light reflective plate having an applied layer containing spherical particles on at least one side of the white polyester film according to claim 1 and an absolute value of a difference in refractive indexes between the spherical particle and a binder resin constituting the applied layer is 0.10 or less.

6. The white polyester film according to claim 5, wherein said spherical particle is a nonporous resin particle and a coefficient of variation CV of a volume average particle size is 30% or less.

7. The white polyester film according to claim 6, wherein a resin constituting said spherical particle is at least one selected from the group consisting of acrylic resin, silicone resin, and polystyrene resin, acrylic copolymer, polystyrene copolymer, and copolymer of acrylic vinyl monomer and styrene vinyl monomer.

8. The white polyester film according to claim 7, wherein said spherical particle contains at least an acrylic resin and said acrylic copolymer is composed of a copolymer of methyl methacrylate and ethylene glycol dimethacrylate.

9. The white polyester film according to claim 7, wherein said spherical particles are particles having a crosslinking structure.

10. The white polyester film according to claim 5, wherein said spherical particle contains an ultraviolet absorber and/or a light stabilizer.

11. The white polyester film according to claim 10, wherein said ultraviolet absorber is at least one of ultraviolet absorbers selected from the group consisting of benzotriazole-based, benzophenone-based, oxalic anilide-based, cyanoacrylate-based and triazine-based ultraviolet absorbers.

12. The white polyester film according to claim 10, wherein said light stabilizer is a hindered amine-based light stabilizer.

13. The white polyester film according to claim 5, wherein a resin constituting said spherical particle contains the same monomer components as those of a binder resin constituting said applied layer.

14. The white polyester film according to claim 1, wherein said white film comprises a three-layer structure of layer A/layer B/layer A, and the layer B contains air bubbles, and the layer A is formed by including inorganic particles and/or organic particles in polyester and the content of the particles is 0.5% by weight or less with respect to the total weight of each layer A.

15. The white polyester film according to claim 1, wherein said white film comprises a three-layer structure of layer A/layer B/layer A', the layer B contains air bubbles, and the layer A and/or the layer A' is formed by including inorganic particles and/or organic particles in polyester and the thickness of the layer A' is 0.1 to 3 μm.

16. A lamp reflector for a liquid crystal backlight, wherein the white reflective film according to claim 1 has an applied layer face directed to a light source side.

17. A direct type liquid crystal backlight, wherein the white reflective film according to claim 1 has an applied layer face directed to a light source side.

* * * * *